US012465547B2

(12) United States Patent
Waldridge

(10) Patent No.: US 12,465,547 B2
(45) **Date of Patent: *Nov. 11, 2025**

(54) THERAPEUTIC MASSAGE SYSTEM

(71) Applicant: Eva Medtec, Inc., Shakopee, MN (US)

(72) Inventor: Irene Waldridge, Shakopee, MN (US)

(73) Assignee: Eva Medtec, Inc., Bloomington, MN (US)

( * ) Notice: Subject to any disclaimer, the term of this patent is extended or adjusted under 35 U.S.C. 154(b) by 951 days.

This patent is subject to a terminal disclaimer.

(21) Appl. No.: 17/404,390

(22) Filed: Aug. 17, 2021

(65) Prior Publication Data

US 2022/0031557 A1 Feb. 3, 2022

Related U.S. Application Data

(63) Continuation-in-part of application No. 15/224,330, filed on Jul. 29, 2016, now Pat. No. 11,090,216.

(Continued)

(51) Int. Cl.
*A61H 9/00* (2006.01)

(52) U.S. Cl.
CPC ... *A61H 9/0071* (2013.01); *A61H 2201/0103* (2013.01); *A61H 2201/0134* (2013.01);

(Continued)

(58) Field of Classification Search
CPC .................. A61H 9/0071; A61H 9/005; A61H 2201/0103; A61H 2201/0134;

(Continued)

(56) References Cited

U.S. PATENT DOCUMENTS

| | | | |
|---|---|---|---|
| 4,583,255 | A | 4/1986 | Mogaki et al. |
| 5,267,364 | A | 12/1993 | Volk |

(Continued)

FOREIGN PATENT DOCUMENTS

| | | | |
|---|---|---|---|
| CA | 2282101 A1 | 3/2000 | |
| CN | 202822057 U | 3/2013 | |

(Continued)

OTHER PUBLICATIONS

US 7,534,214 B2, 05/2009, Dehli (withdrawn)

*Primary Examiner* — Justine R Yu
*Assistant Examiner* — Matthew R Moon
(74) *Attorney, Agent, or Firm* — Dicke, Billig & Czaja, PLLC

(57) ABSTRACT

A therapeutic massage system is provided. The system is characterized by a controllable compressed air delivery system and a cushion adapted for operative union with a portion of the air delivery system. The cushion includes a support pad and a therapy pad, the support pad having head and vertebral column supporting portions. The support pad vertebral column supporting portion is characterized by longitudinally extending compartments containing filler material. A central compartment of compartments of the support vertebral column supporting portion having a primary region traversing an axial centerline of said cushion and secondary regions spaced apart from said primary central region. The therapy pad overlays and is affixed to the vertebral column supporting portion of the support pad, the therapy pad including a plurality of fluid fillable channels for receiving a vertebral column wherein select fluid fillable channels of the plurality of fluid fillable channels of the therapy pad are fillable via programmed actuation of an actuatable element of the air delivery system. Filler material of the compartments of the support vertebral column supporting portion are responsive to receipt of body weight (Continued)

upon the cushion and select filling of the plurality of fluid fillable channels of the therapy pad, filler material of the regions of the central compartment being passable throughout segments of same in response to receipt of body weight upon the cushion and select filling of the plurality of fluid fillable channels of the therapy pad.

20 Claims, 27 Drawing Sheets

Related U.S. Application Data

(60) Provisional application No. 62/199,036, filed on Jul. 30, 2015.

(52) U.S. Cl.
CPC ................ *A61H 2201/1238* (2013.01); *A61H 2201/1609* (2013.01); *A61H 2201/1623* (2013.01); *A61H 2201/1685* (2013.01); *A61H 2201/5056* (2013.01)

(58) Field of Classification Search
CPC .... A61H 2201/1238; A61H 2201/1609; A61H 2201/1623; A61H 2201/1685; A61H 2201/5056; A61H 2205/081; A61H 2201/0192; A61H 2201/1607; A61H 2201/1616; A61H 2201/1626; A61H 2203/0468; A61H 2205/062; A61H 2205/086
See application file for complete search history.

(56) References Cited

U.S. PATENT DOCUMENTS

| | | | | |
|---|---|---|---|---|
| 5,807,290 | A | 9/1998 | Barry | |
| 5,815,865 | A | 10/1998 | Washburn | |
| 5,893,184 | A | 4/1999 | Murphy | |
| 5,976,099 | A * | 11/1999 | Kellogg | A61H 9/0078 128/877 |
| 6,179,796 | B1 | 1/2001 | Waldridge | |
| 6,361,512 | B1 | 3/2002 | Mackay | |
| 6,643,875 | B2 | 11/2003 | Boso et al. | |
| 6,645,165 | B2 | 11/2003 | Waldridge et al. | |
| 6,687,935 | B2 | 2/2004 | Reeder et al. | |
| 6,860,862 | B2 | 3/2005 | Waldridge et al. | |
| 6,952,852 | B2 | 10/2005 | Reeder et al. | |
| 6,966,884 | B2 | 11/2005 | Waldridge et al. | |
| 7,467,432 | B2 * | 12/2008 | Brogan | A47G 9/10 5/636 |
| 7,604,606 | B2 | 10/2009 | Dehli | |
| 7,849,545 | B2 * | 12/2010 | Flocard | A61B 5/6891 5/713 |
| 8,021,313 | B2 | 9/2011 | Dehli | |
| 8,052,630 | B2 | 11/2011 | Kloecker et al. | |
| 8,167,856 | B2 | 5/2012 | Kazala, Jr. et al. | |
| 8,418,296 | B1 | 4/2013 | Hanlon et al. | |
| 8,745,796 | B2 | 6/2014 | Liu | |
| 8,753,383 | B2 | 6/2014 | Parish et al. | |
| 8,863,338 | B2 | 10/2014 | Dzioba et al. | |
| 8,889,338 | B2 | 11/2014 | McCausland et al. | |
| 8,966,689 | B2 | 3/2015 | McGuire et al. | |
| 9,015,885 | B2 | 4/2015 | Chapin | |
| 9,119,760 | B2 | 9/2015 | Purdy | |
| 11,090,216 | B2 * | 8/2021 | Waldridge | B32B 5/142 |
| 2004/0210176 | A1 * | 10/2004 | Diana | A61H 23/04 601/151 |
| 2004/0226103 | A1 * | 11/2004 | Reger | A61G 7/05769 5/713 |
| 2007/0088239 | A1 * | 4/2007 | Roth | A61H 9/0078 601/152 |
| 2008/0082029 | A1 | 4/2008 | Diana | |
| 2009/0270774 | A1 | 10/2009 | Gowda | |
| 2009/0299239 | A1 | 12/2009 | Meyer | |
| 2010/0026064 | A1 * | 2/2010 | Marsden | B60N 2/4235 297/250.1 |
| 2011/0314612 | A1 | 12/2011 | Hsu | |
| 2012/0079662 | A1 | 4/2012 | Dzioba | |
| 2013/0000047 | A1 | 1/2013 | McCann et al. | |
| 2013/0042413 | A1 | 2/2013 | Cao | |
| 2013/0085431 | A1 | 4/2013 | Malhi | |
| 2014/0007353 | A1 | 1/2014 | Stryker | |
| 2015/0148196 | A1 | 5/2015 | Hanks et al. | |
| 2016/0081488 | A1 * | 3/2016 | Zhang | A47C 27/056 5/702 |
| 2019/0239665 | A1 * | 8/2019 | Ponder | A47G 9/10 |

FOREIGN PATENT DOCUMENTS

| | | | |
|---|---|---|---|
| EP | 0986999 | A2 | 3/2000 |
| JP | 2000-185081 | A | 7/2000 |
| JP | 2000-237256 | A | 9/2000 |
| JP | 2008-073185 | A | 4/2008 |
| JP | 2008-113889 | A | 5/2008 |
| JP | 4258209 | B2 | 4/2009 |
| WO | 2004037149 | A1 | 5/2004 |
| WO | 2012009739 | A1 | 1/2012 |
| WO | 2014194756 | A1 | 11/2014 |

* cited by examiner

PRESSURE PROFILE #1

PRESSURE PROFILE #2

PRESSURE PROFILE #3

PRESSURE PROFILE #4

PRESSURE PROFILE #5

THERAPEUTIC MASSAGE SYSTEM

This is a United States continuation-in-part patent application filed pursuant to 35 USC § 111(a) and 37 CFR § 1.53(b) claiming priority under 35 USC § 120 of/to U.S. patent applilcation Ser. No. 15/224,330 filed Jul. 29, 2016, entitled THERAPEUTIC MASSAGE SYSTEM, said application claiming priority under 35 USC § 120 of/to U.S. Pat. Appl. Ser. No. 62/199,036 filed Jul. 30, 2015, likewise entitled THERAPEUTIC MASSAGE SYSTEM, the disclosures of which are hereby incorporated by reference in their entireties.

FIELD OF THE INVENTION

The present invention notionally relates to, without limitation, a system or device for managing pain and relieving stress. More particularly, system, apparatus, assemblies, subassemblies, etc. having utility in connection to delivering a therapeutic pressure profile to a user and/or cushioningly supporting such user in furtherance of therapeutic massage delivery is contemplated.

BACKGROUND

Massage therapy can be an effective form of natural, non-invasive treatment for individuals who experience chronic or acute pain in soft tissue and/or muscular-skeletal structures, or who suffer from circulatory conditions. For example, hands-on massage therapy pressures can elicit an immediate relaxation response as well as a lasting improvement in certain physiological systems such as the parasympathetic nervous system. Specific health benefits may include a reduction in stress and risks related to stress, such as hypertension, fatigue, digestive disorders, anxiety, and certain cardiac arrhythmias. In addition, the physical manipulation that occurs during certain forms of massage therapy can improve circulation of blood and lymph and promote the release and/or relaxation of nerves and deep connective tissue, e.g., manual lymphatic drainage (MLD).

Better circulation can improve the health of cells by enhancing the supply of oxygen delivered to muscles. Improved cellular health causes tissues to function more efficiently, which in turn can reduce swelling in soft tissues by enhancing the removal of cellular waste products and increasing the absorption of excess fluids. By manipulating soft connective tissue, massage therapy may enhance the delivery of proper nutrition to cells. Cells may then begin to operate more efficiently, thereby improving the overall functioning of muscles and organs.

In addition to treating muscle aches and pains and relaxing the mind and body, massage therapy has proven especially beneficial in facilitating circulation and improving health. Customized bodywork can clear vessel pathways, help remove wastes, proteins, and excess fluids from cells, and allow for increased movement of lymphocytes. Lymphatic massages are therefore frequently used to reduce swelling, stimulate the immune system, and increase energy levels, among other beneficial effects.

Therapeutic massages are frequently performed hands-on by a massage therapist. Proper therapeutic technique typically requires specialized knowledge and training and, in some states, may require certification, licensing, or other type of credentialing. While trained therapeutic massage therapists can provide an effective remedy for the aforementioned conditions, there are drawbacks. In particular, payment is normally required for receiving the services of a therapeutic massage therapist. Over time, this can generate significant costs. Furthermore, an office visit may be necessary to receive the requisite care. This requires an additional expenditure of time and may be impractical for individuals whose mobility is reduced, suffer from significant pain symptoms or live in remote geographical areas.

An alternative to seeking hands-on treatment from a massage therapist is using a portable or in-home massage device. There are many such massage devices available on the market today. Automated massage devices are generally less expensive than a massage therapist's services over the course of a selected therapy treatment and can be operated in a non-clinical environment such as a home or other residence. They typically function by using rollers and/or vibration methods to apply pressure and may be incorporated into a chair, pad or other support apparatus. These automated massage therapy devices, however, are often ineffective or inefficient, or fail to apply comfortable or effective pressures. In particular, these devices frequently apply excess pressure or in an improper location on an individual's body, or apply the pressure for an inadequate or excessive period of time. For example, many automated massage therapy devices do not follow the natural curvature of the body. As a result, a user or other operator of automated massage therapy devices must continually re-position the device to different parts of the body. Even if the user or operator is able to properly reposition the device, such devices still fail to adjust the applied pressure for optimal therapeutic effectiveness on a particular region of the user's body. Moreover, many automated massage therapy devices may aggravate certain conditions or cause additional pain, such as by applying pressure in excess of what is comfortable, relaxing or necessary for optimal therapeutic effect.

Therefore, there is a need for a massage device that self-adjusts to the contours of an individual's body and that delivers an optimal pressure profile for delivering effective and efficient treatment to treat the specific therapeutic needs of a user. There is a further need for a therapeutic massage device that provides comfort, alleviates high-pressure points and can be easily and properly operated by all users, including those with physical challenges or impairment. There is an additional need for a system that can provide targeted delivery of therapeutic massage treatments to the muscles and soft tissues proximal to and progressively along portions of the spine of a user, and/or the user's neck.

SUMMARY

Embodiments of the therapeutic massage system of the present invention substantially meet the aforementioned needs of the industry. In an embodiment, a therapeutic massage system includes a cushion, connective tubing, and a controller unit. The cushion is operably connected to the controller unit via the tubing.

The cushion has a support pad for supporting an individual lying prone thereon and a therapy pad for delivering massage therapy. The support pad and the therapy pad may be arcuate in shape for enhanced comfort and functionality. The support pad includes a plurality of compartments that are filled with a filling material, such as microbeads. The compartments are separated by seams, or compartment abutments, each of which forms an interface having a generally wavelike, or sinusoidal, shape. The support pad is generally self-adjusting to conform to the contours of the individual's body. The therapy pads include a plurality of abutting channels. Each interface between the channels also has a generally sinusoidal shape. When an individual lies on the cushion, the channels are positioned into optimal alignment with the contours of the individuals' body by virtue of the self-adjusting support pad. The channels are selectively inflatable and deflatable to apply a predetermined pressure profile to the user.

Alternately, the cushion advantageously but not necessarily includes a support pad and a therapy pad, the support pad having head and vertebral column supporting portions. The support pad vertebral column supporting portion is characterized by longitudinally extending compartments containing filler material. A central compartment of compartments of the support vertebral column supporting portion having a primary region traversing an axial centerline of said cushion and secondary regions spaced apart from said primary central region.

The therapy pad overlays and is affixed to the vertebral column supporting portion of the support pad, the therapy pad including a plurality of fluid fillable channels for receiving a vertebral column wherein select fluid fillable channels of the plurality of fluid fillable channels of the therapy pad are fillable via programmed actuation of an actuatable element of the air delivery system. Filler material of the compartments of the support vertebral column supporting portion are responsive to receipt of body weight upon the cushion and select filling of the plurality of fluid fillable channels of the therapy pad, filler material of the regions of the central compartment being passable throughout segments of same in response to receipt of body weight upon the cushion and select filling of the plurality of fluid fillable channels of the therapy pad.

A controller unit generally includes at least one processor or controller programmed to execute a pressure profile by inflating and deflating the channels of the support pad in accordance with a prescribed massage treatment plan. The processor can control the progression, frequency, duration, and intensity at which selected channels inflate and deflate, thus causing the massage treatment plan to be delivered. The controller unit also includes a diverter and an actuator for controlling the diverter. Alternatively, the diverter and the actuator may be provided as a separate unit or separate units. The processor operatively controls the diverter to communicate air provided by an air source, such as an air compressor, to one of a plurality of chambers located within the diverter. The air is then communicated through connective tubing to one of the channels, thereby inflating the channel. The diverter can be actuated to communicate air from the air source to another chamber, thereby inflating the other channel. The diverter can substantially simultaneously deflate the previously inflated channel by directing air through an exhaust port.

The processor can be programmed with information that allows the pressure-therapy treatment to be customized by an individual. The pressure-therapy treatment may be customized to deliver inflation-induced pressure to the individual's gluteus, back, shoulders, and/or neck. The pressure-therapy treatment may also be customized to provide pressure asymmetrically to selected portions of the aforementioned anatomy.

The therapeutic massage system is thereby capable of providing multiple sources or types of pressure therapy. A first source of pressure therapy originates in the support pad, which applies pressure by continuously conforming to and adjusting and supporting an individual's body. A second source of pressure therapy originates in the therapy pad, which applies localized pressure along the sinusoidal wave-shaped channels located between the individual's body and the support pad. A third source of pressure therapy originates in the controller unit, which can execute instructions for sequentially inflating and deflating therapy pad channels in accordance with a prescribed treatment plan. Any one of these sources alone will provide beneficial massage therapy to a user, while the combination of any or all of these sources will provide further benefits and advantages.

DESCRIPTION OF THE PREFERRED EMBODIMENTS

Figure 1:
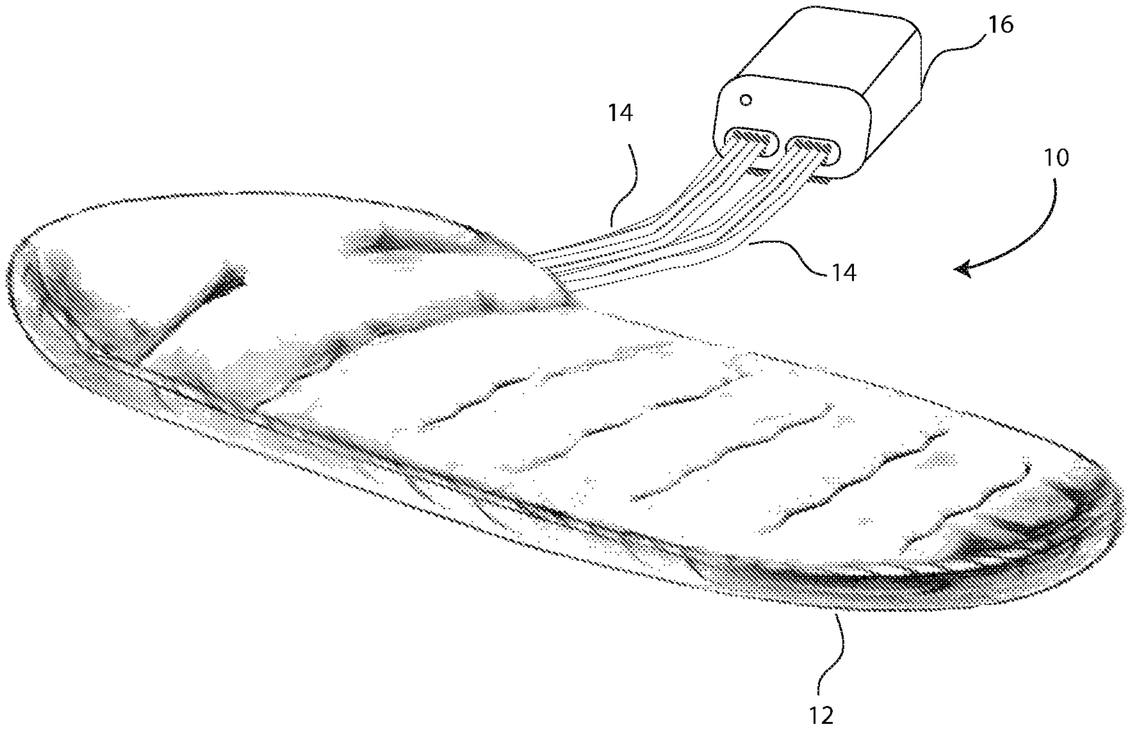
FIG. 1 is a perspective view of a massage system.
Figure 6A:
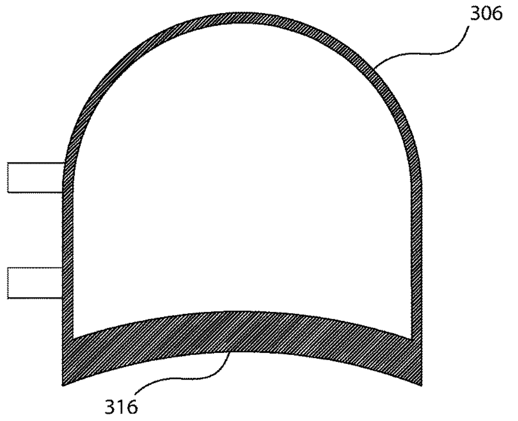
FIGS. 6A-6J illustrate the layers of fabric used to form a support pad, a therapy pad and a cover for a cushion.
Figure 6D:
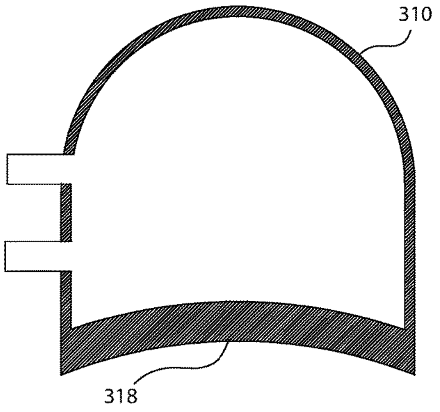
Figure 6B:
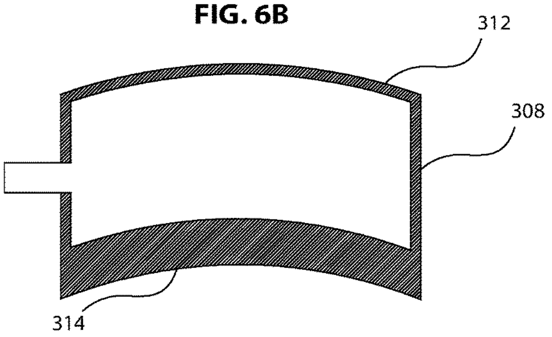
Figure 6E:
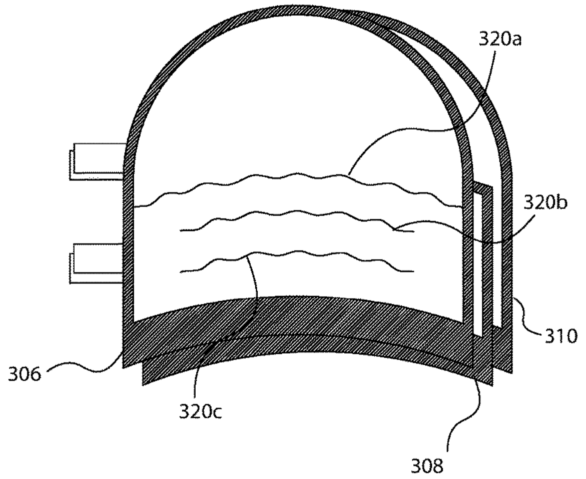
Figure 6C:
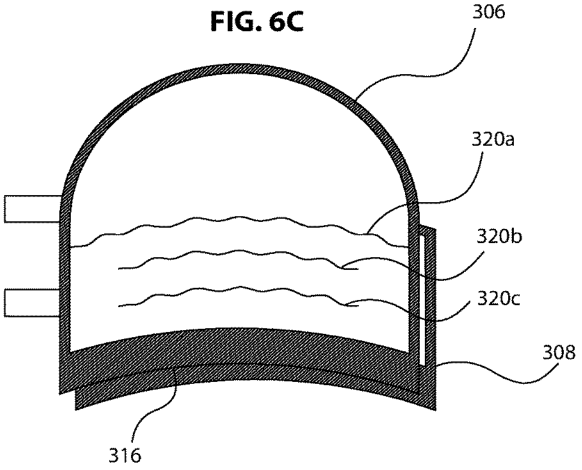
Figure 6F:
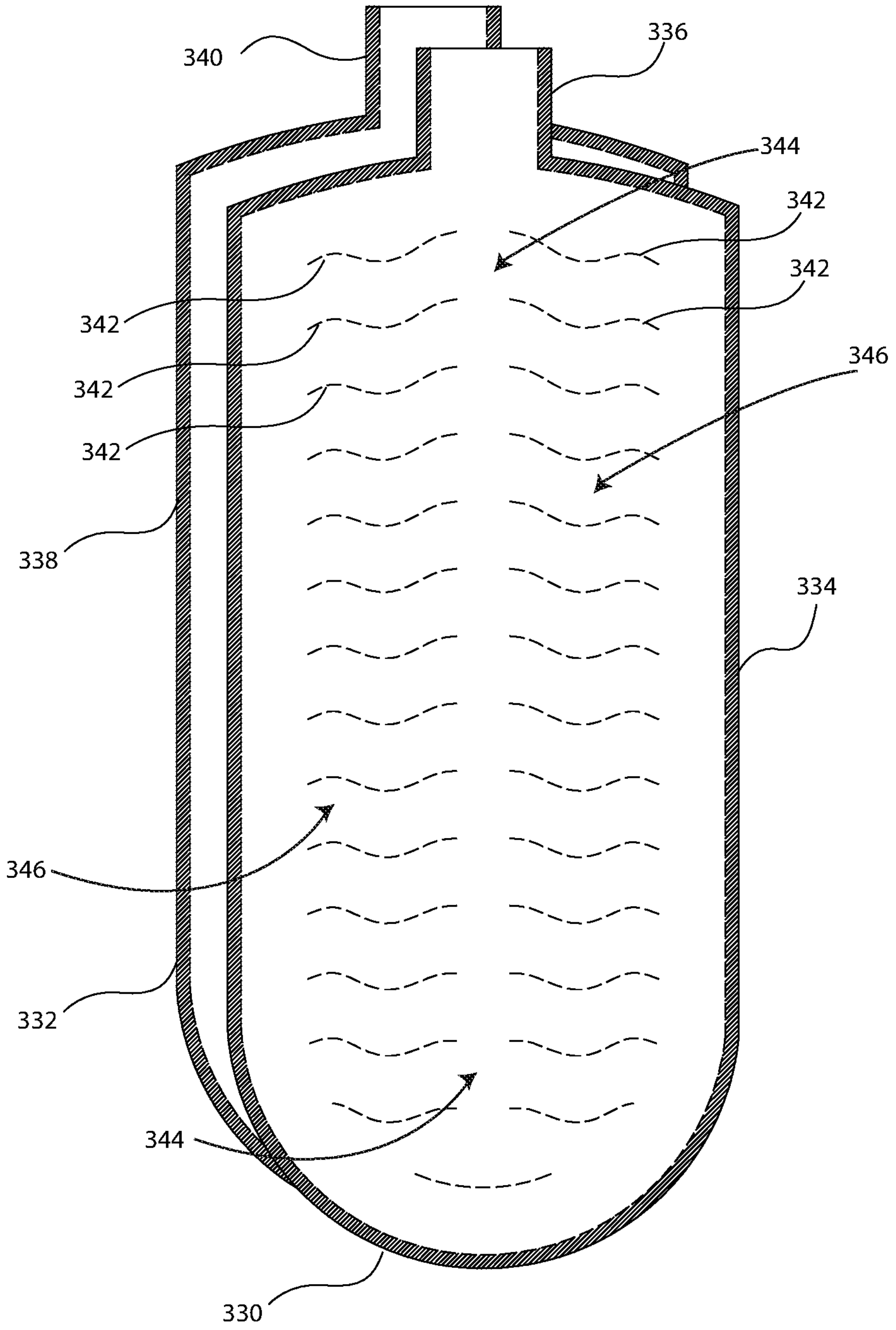
Figure 6G:
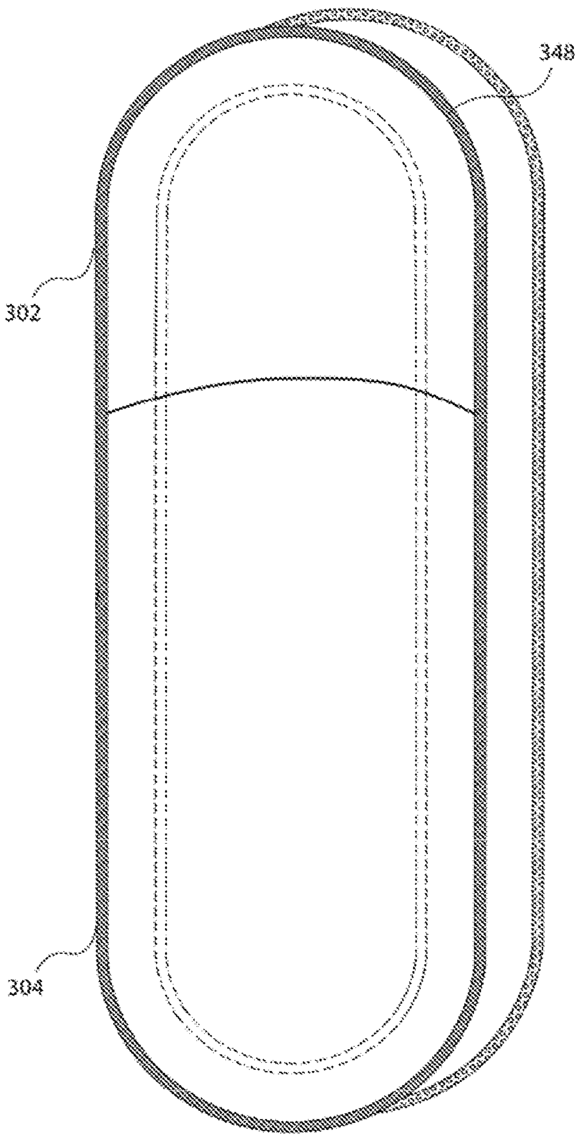
Figure 6H:
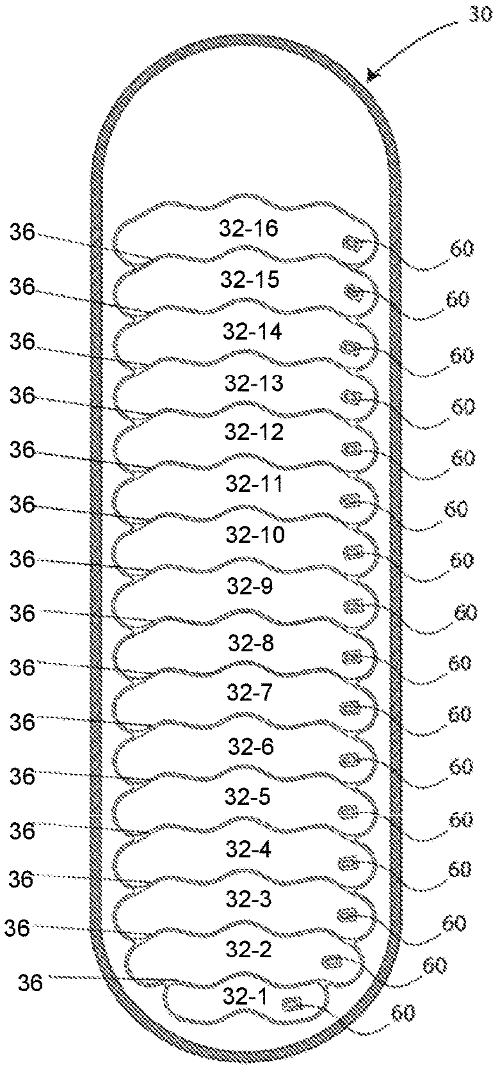
Figure 6I:
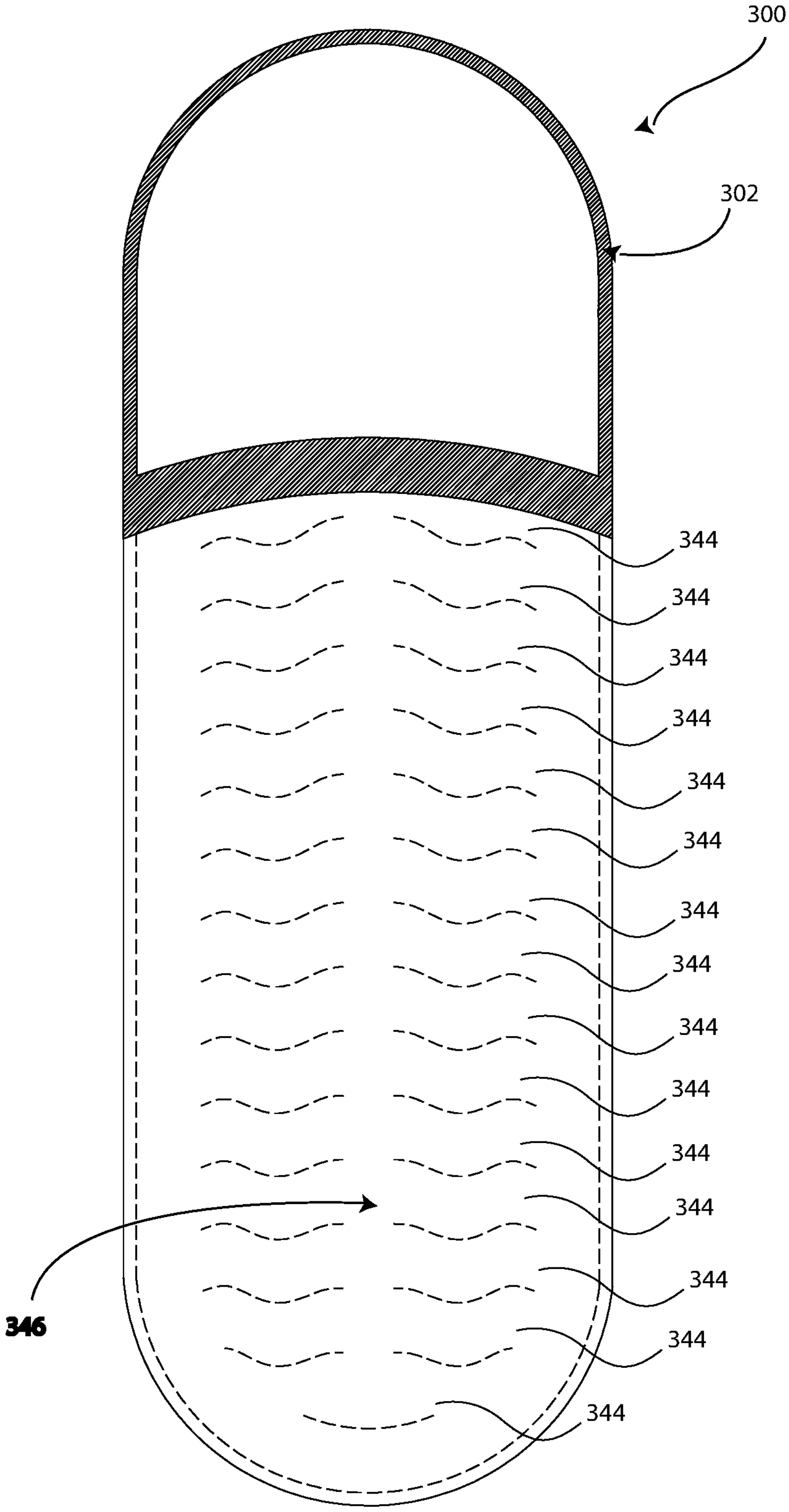
Figure 6J:
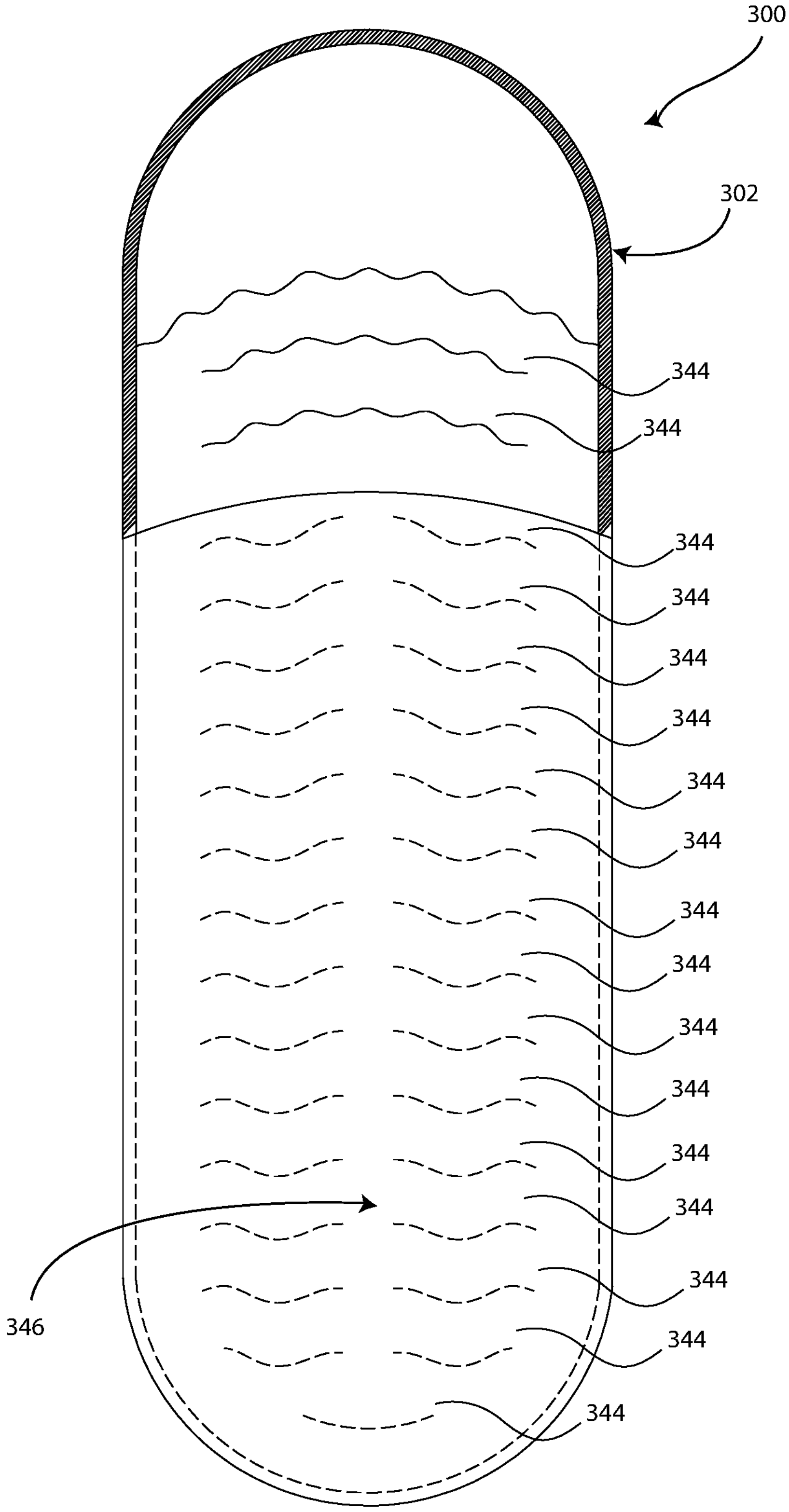
Figure 14:
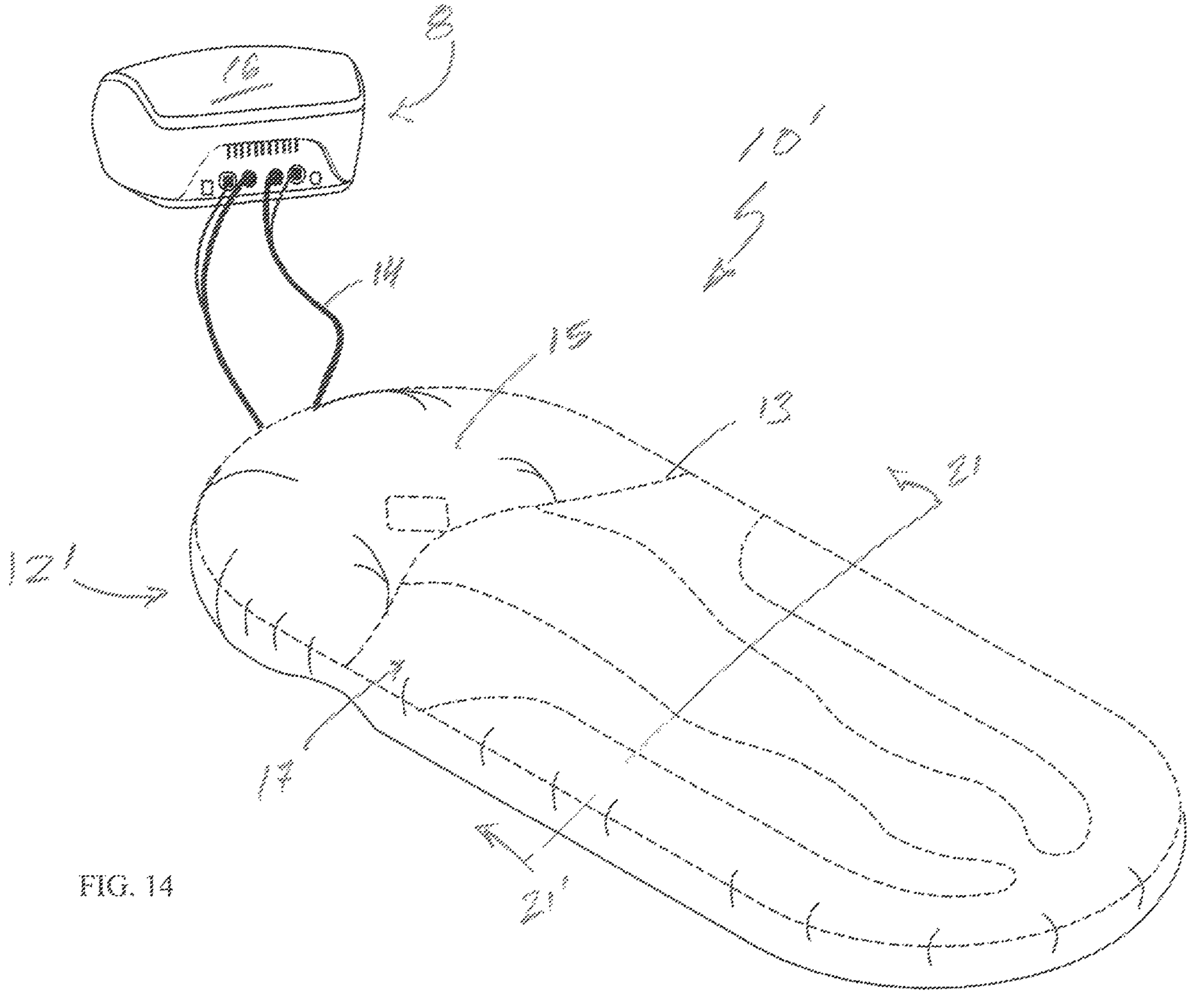
FIG. 14 depicts, a further massage system, a cushion thereof shown in top or upperside perspective view.
Figure 22:
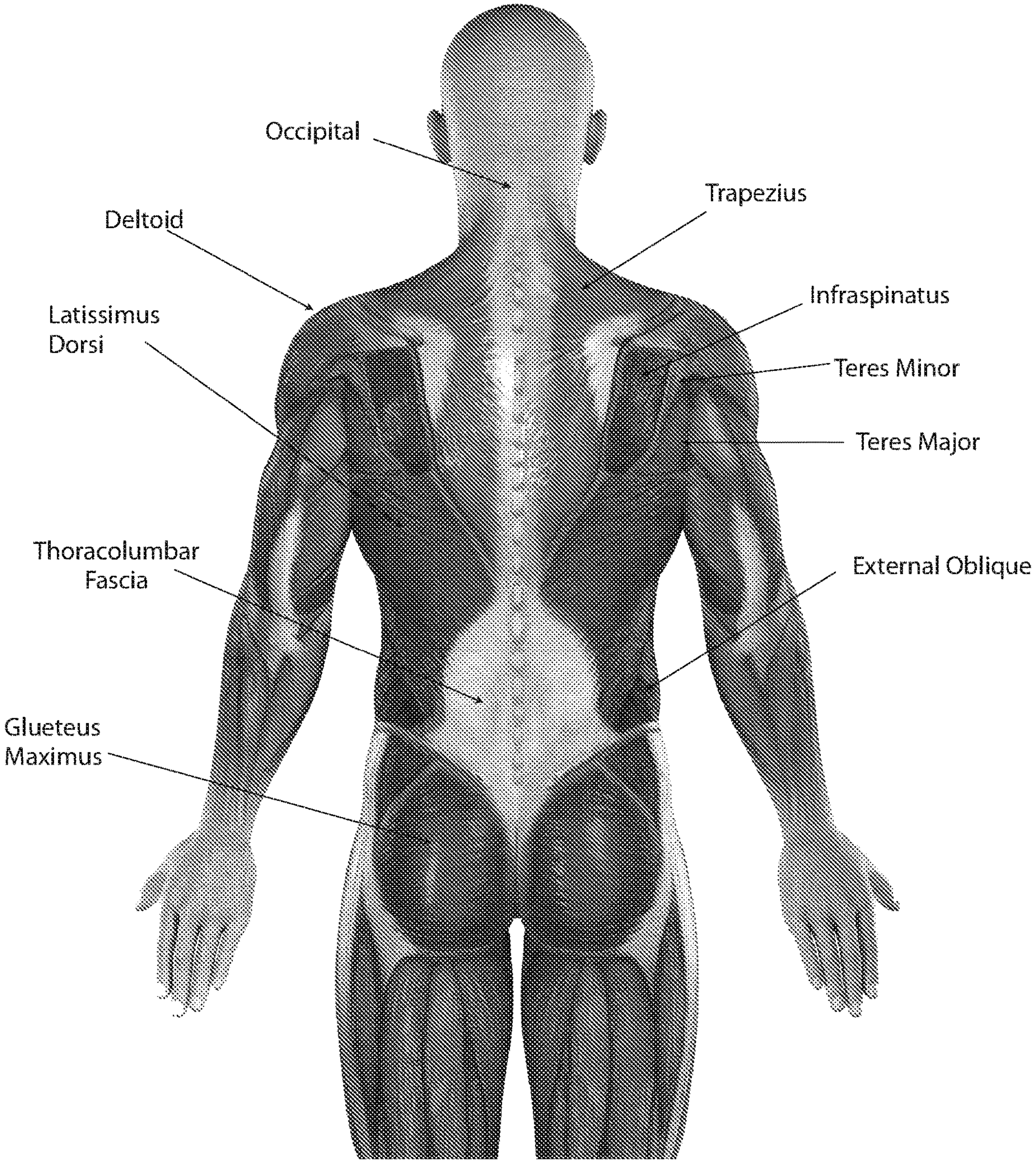
FIG. 22 is an illustration of the musculature of an individual.
Figure 23:
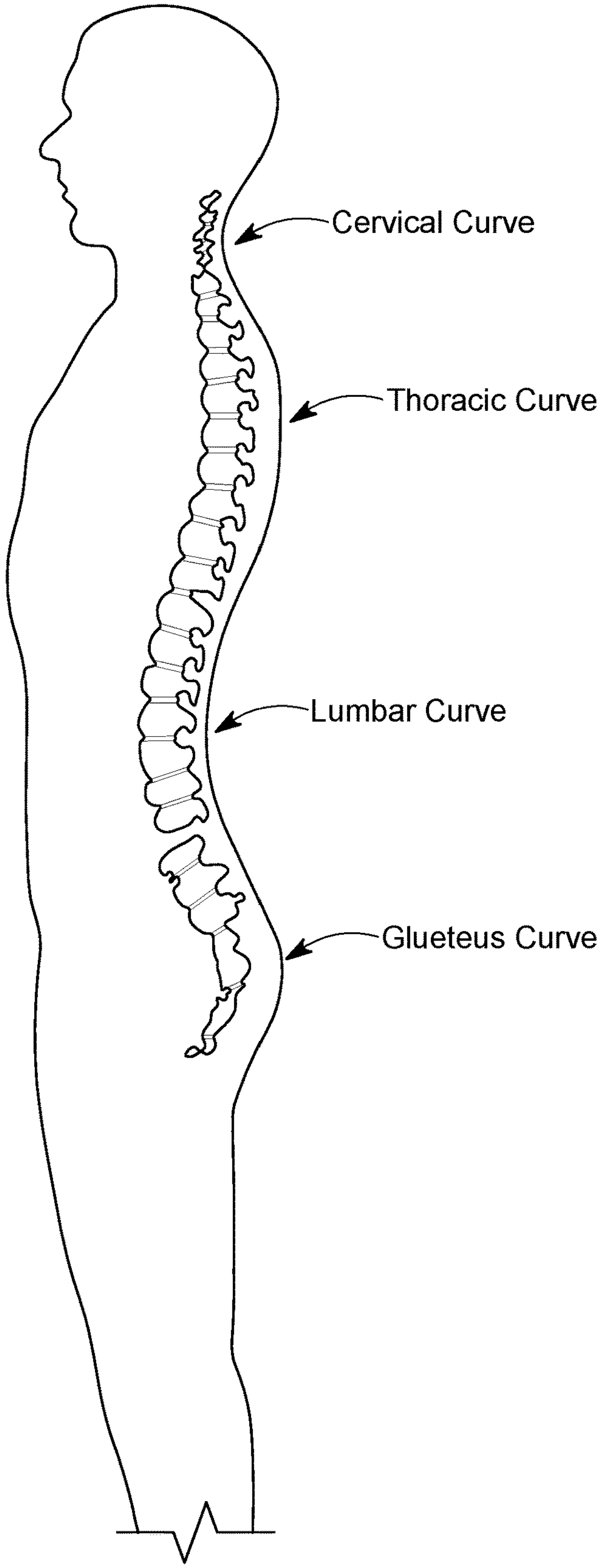
FIG. 23 is an illustration of the vertebral regions of an individual.

A massage system 10, according to an initial contemplated embodiment is generally depicted FIG. 1, a further contemplated system 300 is depicted FIG. 6I, and, yet a further contemplated system 10' is generally depicted FIG. 14. Although contemplated massage systems, and a cushion characterizing same, can be used for any number of purposes, the illustrated, advantageous, non-limiting embodiments are configured to deliver therapeutic pressure treatments to an individual, more particularly, the system may be particularly useful for providing customized massage therapy to the individual's musculature proximal the individual's vertebrae, or spinal region, with representations as to each shown with reference to FIGS. 22 & 23, respectively.

Figure 2:
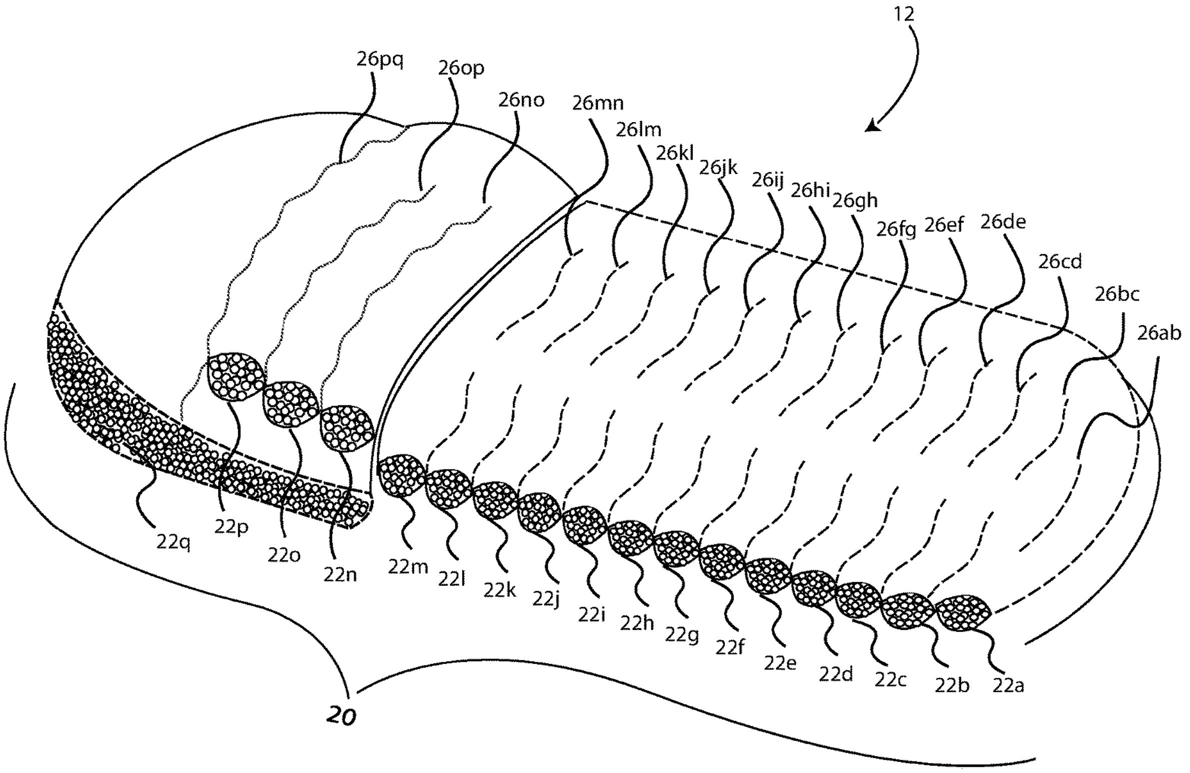
FIG. 2 is a cross-sectional perspective view of a support pad of a cushion for the massage system depicted in FIG. 1.
Figure 3:
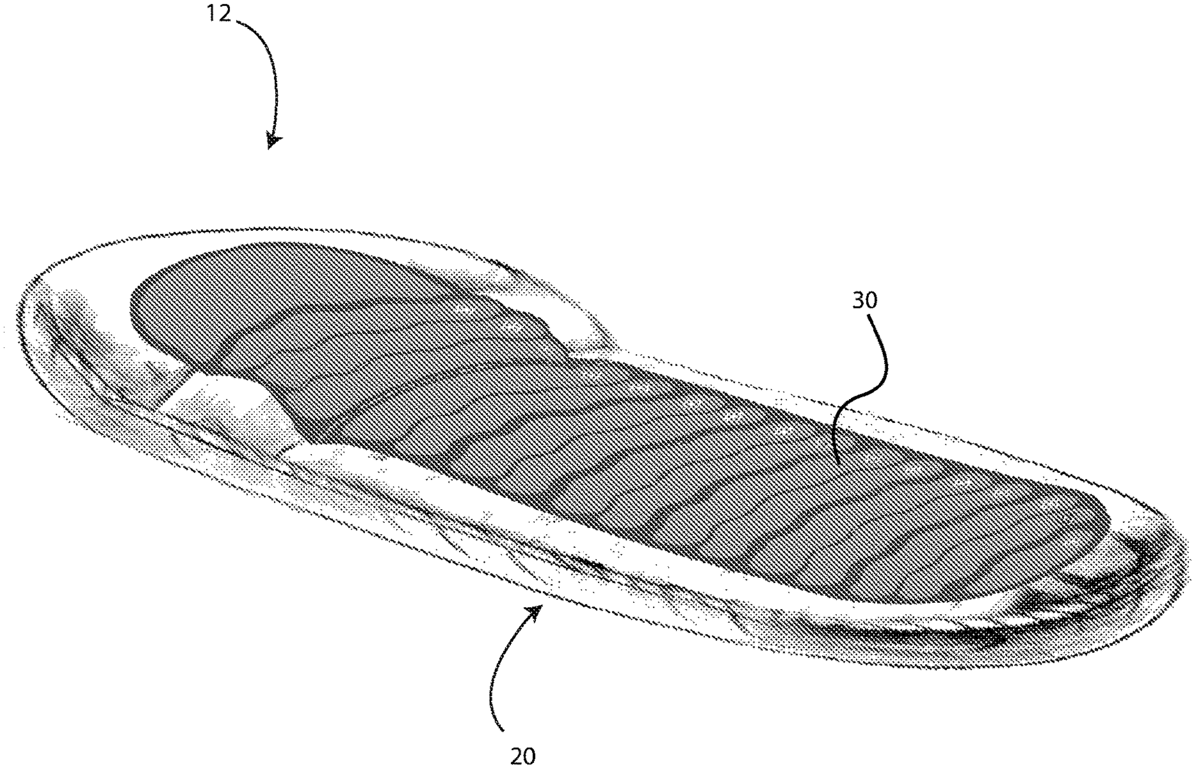
FIG. 3 is a perspective view of a cushion of FIG. 2 depicting a therapy pad in phantom.
Figure 4A:
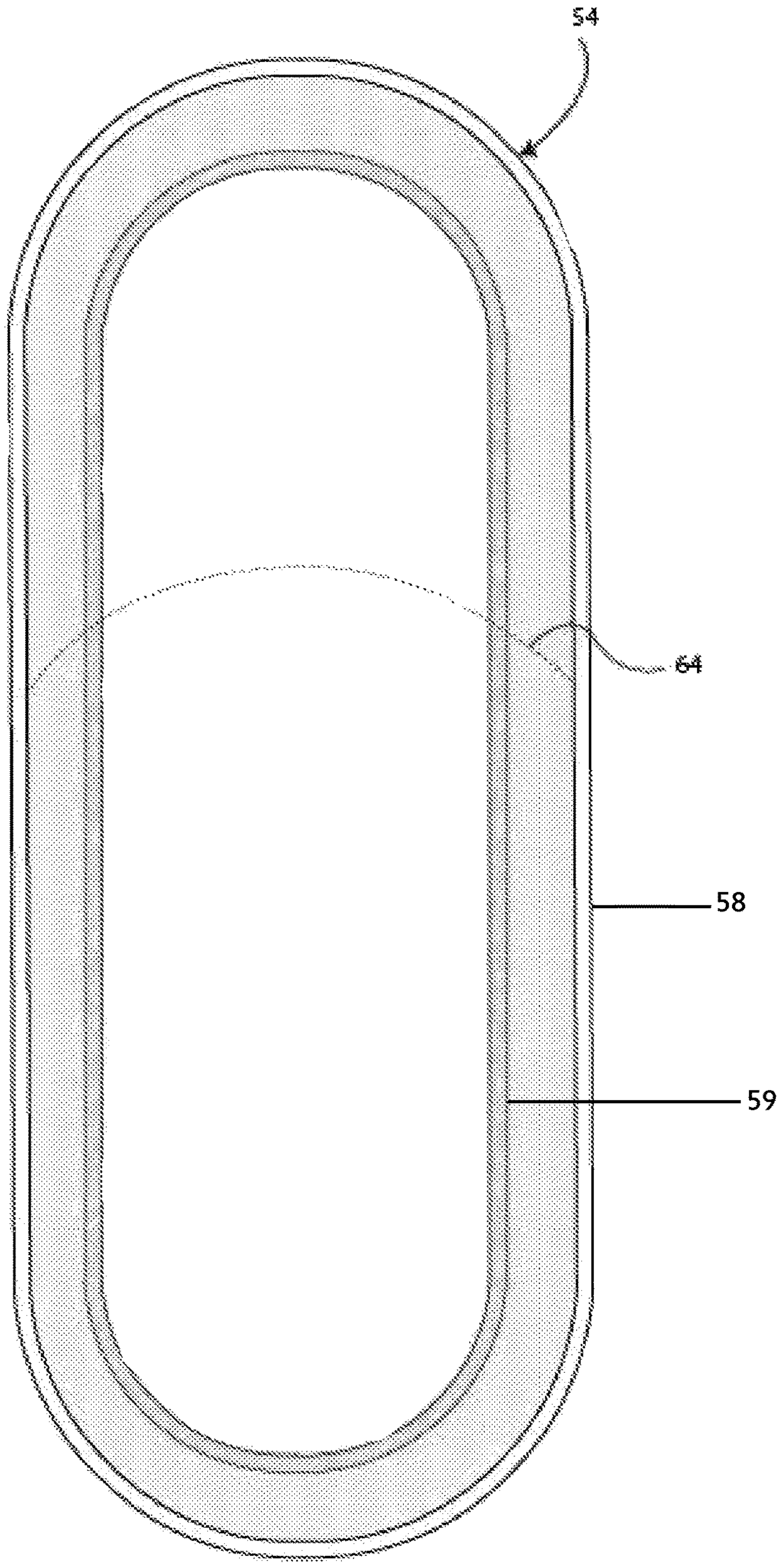
FIG. 4A is a top view of a cover used to form a cushion for a massage system.
Figure 4B:
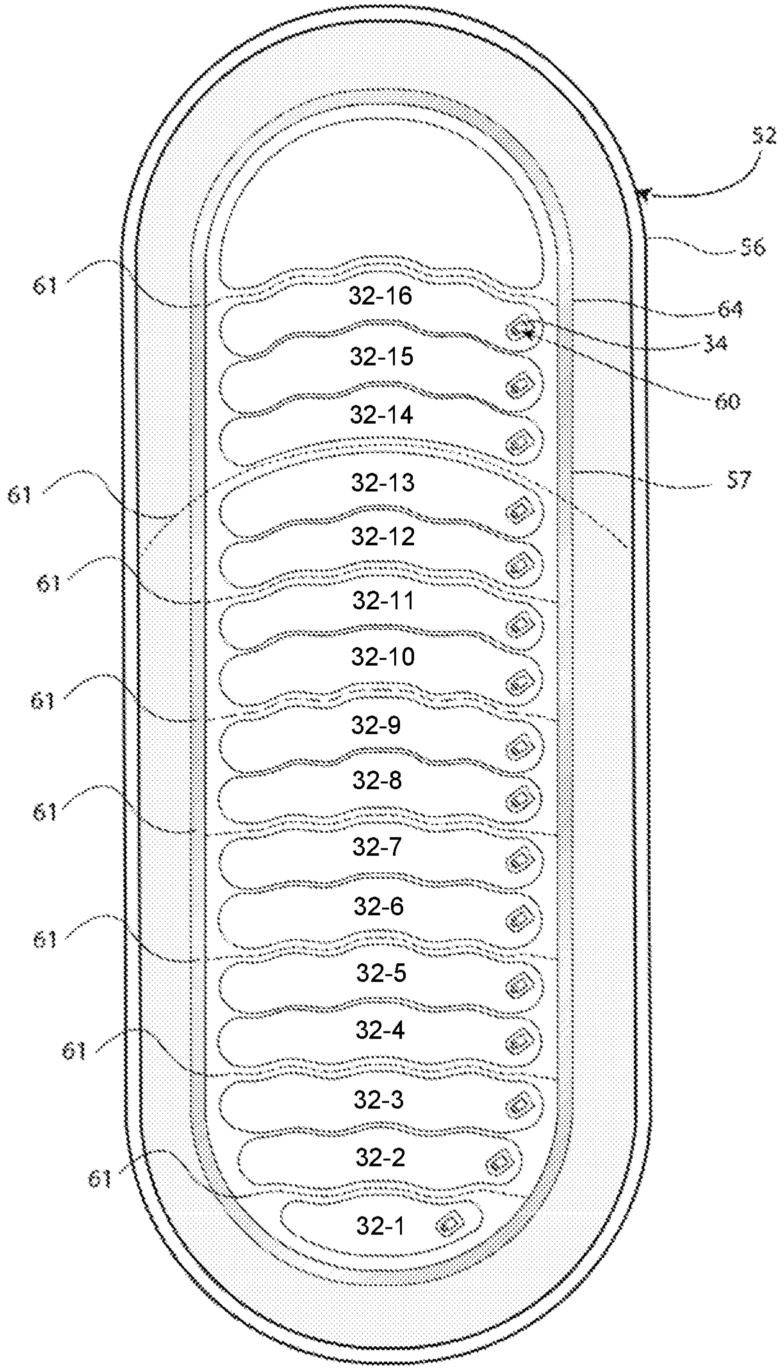
FIG. 4B is a bottom view of RF heat seal channels attached to the cover of FIG. 4A.
Figure 5A:
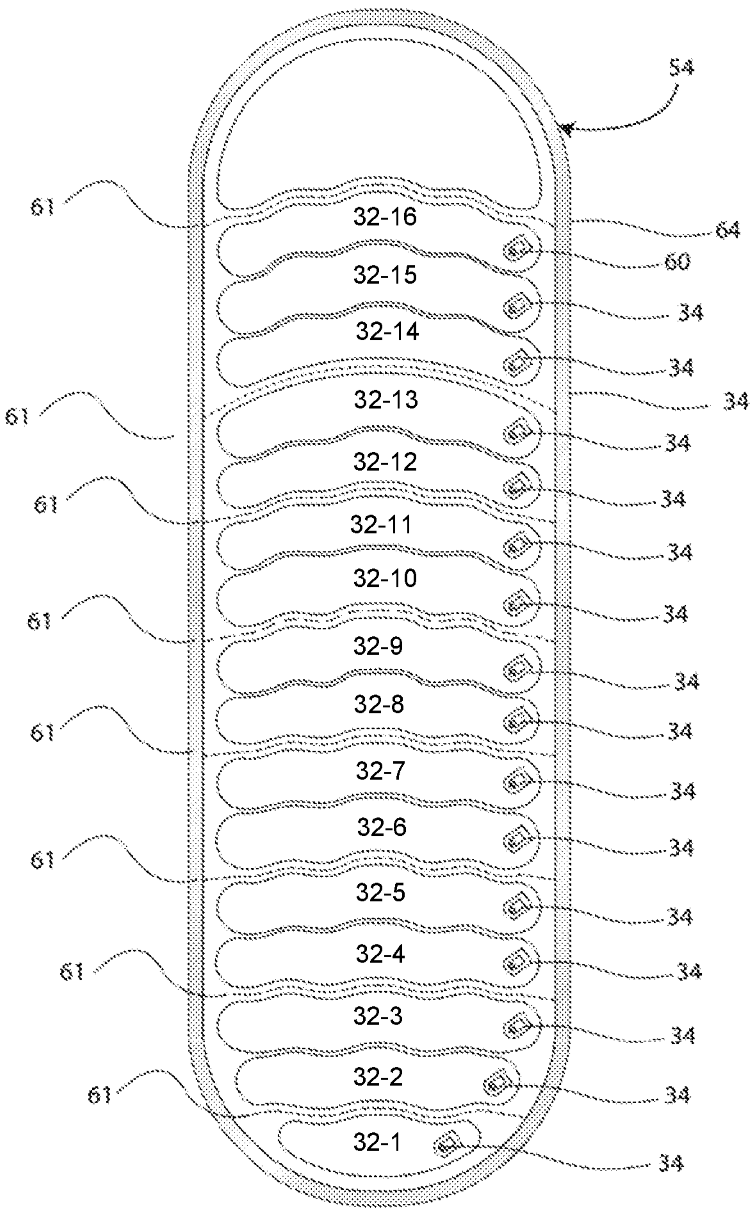
FIG. 5A is an illustration of a therapy pad.

The instant description proceeds with presentation of the initial contemplated system 10 embodiment as is generally presented in connection to FIGS. 1-3, with particulars supplied FIGS. 4 & 5. Thereafter, a further embodiment is narratively set forth in connection to contemplated system embodiment 300 of FIG. 6. Select functional features and/or attributed for one or more contemplated embodiments are thereafter briefly set forth, followed by particulars for the system 10' embodiment, and some operational/functional context for the system and/or cushion thereof essentially concluding the instant description.

Referring to FIGS. 1-2, massage system 10 generally includes cushion 12, tubing 14, and controller unit 16. In embodiments, massage system 10 may also include an air source (not depicted), such as an air compressor. Tubing 14 communicates a fluid between cushion 12 and controller unit 16. By operating controller unit 16, cushion 12 can thereby be selectively inflated and deflated to deliver a pressure profile by dynamically applying and releasing pressure in a pattern designed to provide a massage experience to a user in accordance with customized pressure-therapy treatment. Said pressure-therapy treatment can be used to treat any number of disorders and types of discomfort, including chronic pain, hypertension and stress, edema, nerve and muscle and spasms, a n d muscle stiffness. In addition to treatment of and alleviating symptoms associated with the aforementioned conditions, benefits to using massage system 10 can include pain relief, mind and body relaxation, injury recovery and rehabilitation, enhanced overall wellness, stress reduction, and improved circulation.

Referring to FIG. 3, cushion 12 includes support pad 20 and therapy pad 30. Cushion 12 may also include an intermediate layer disposed between support pad 20 and therapy pad 30. Cushion 12 may also include an outer layer. The outer layer may be in the form of a cover surrounding support pad 20, therapy pad 30 and the intermediate layer.

Referring to FIG. 2, support pad 20 includes at least one compartment 22, and generally includes a plurality of compartments 22. Compartments 22 may be in the form of discrete, independent pockets. Generally, however, compartments 22 are interconnected. Each compartment 22 typically abuts another compartment 22 at a seam to form compartment interface 26. Compartment interfaces 26 can be shaped in any number of ways. In the illustrated embodiment, compartment interfaces 26 exhibit a wavelike pattern. In particular, the wavelike pattern has substantially similar characteristics to a sinusoidal curve. Compartments 22 are also generally arcuate.

To provide structural support to support pad 20, compartments 22 are filled with a supporting substance, which may be referred to herein as filler material. Although compartments 22 can be filled with air or other fluid, a generally solid material has been found to be beneficial. Nevertheless, said filler material can have certain fluid-like properties, such as, for example, the ability to conform to different shapes in response to varying pressures. In an embodiment, compartments 22 are filled with microbeads (as shown in FIG. 2), or a combination of microbeads and foam, so that support pad 20 can conform to the contours of the individual's body while structurally support the individual and maintaining adequate comfort levels. Interconnecting compartments 22 can facilitate the migration of microbeads within compartments 22, thereby enhancing the ability of support pad 20 to self-adjust to the contours of the individual's body.

Support pad 20 and compartments 22 of support pad 20 can be formed in any number of ways. In an embodiment, support pad 20 is formed by attaching together two pieces of resilient nylon fabric proximal the respective perimeters of each piece of fabric, such as by sewing or stitching. For example, seams can be sewn into the fabric to form compartments 22 and compartment interfaces 26 to permit, while also dissuading, the migration of microbeads between compartments 22. One or more flapped openings can be left in the joined fabric pieces to facilitate loading of microbeads into compartments 22.

As depicted in FIGS. 2 and 3, support pad 20 may include seventeen compartments 22*a*-22*q*, which in tum form compartment interfaces 26*ab*-26*pq*. One skilled in the art will readily recognize that support pad 20 can include greater or few compartments 22 and compartment interfaces 26. The number and size of compartments 22 may be varied in accordance with the anatomical region of an individual targeted by massage 10. Referring again to the embodiment of cushion 12 depicted in FIG. 2, support pad 20 is configured with compartments 22*a*-22*m* to support the gluteal, lumbar, thoracic, and cervical curves of an individual depicted in FIG. 55, while compartments 22*n*-22*q* support head and neck region of a user. Though support pad 20 depicted in FIG. 3 does not include a cover, support pad 20 may be attached to a cover, thereby forming an internal space adapted to receive therapy pad 30.

Figure 8A:
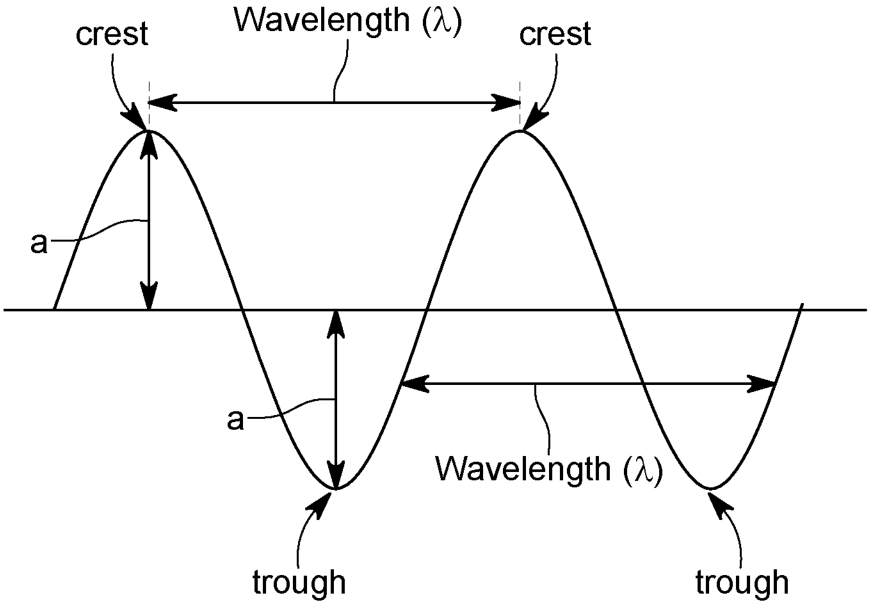
FIG. 8A is a schematic of a sinusoidal wave pattern used as part of a channel interface.
Figure 8B:
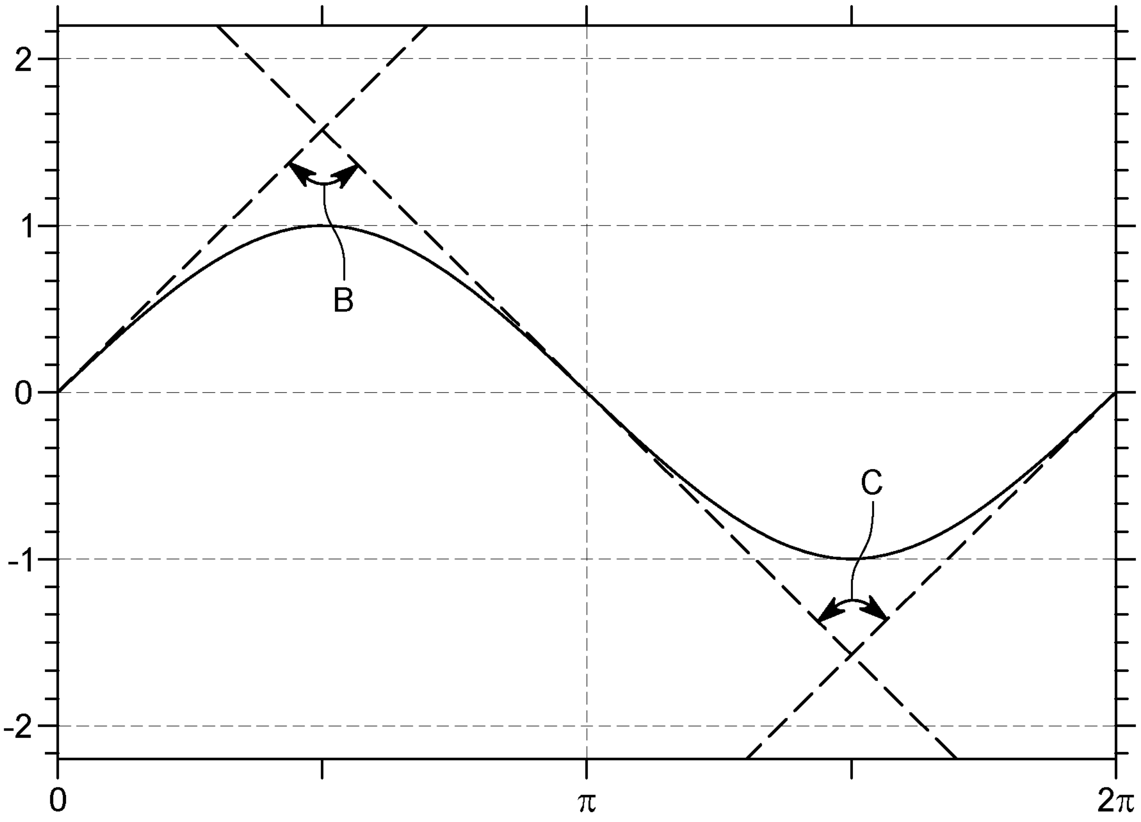
FIG. 8B is a schematic of the sinusoidal wave pattern of the channel interface.

As shown in FIG. 6H, therapy pad 30 includes at least one channel 32, and generally includes a plurality of channels 32. Though channels 32 may be interconnected, each channel 32 generally defines a discrete, independent interior space. Each channel 32 also generally includes a fluid port adapted to receive a tube which is part of connective tubing such that the interior space of channel 22 is in fluid communication with the interior space of a tube. As with compartments 22, each channel 32 typically abuts another channel 32 to form channel interface 36. Channel interfaces 36 can be shaped in any numbers of ways. In an embodiment, channel interfaces 36 form a wavelike pattern. In particular, the wavelike pattern has substantially similar characteristics to a sinusoidal curve. An embodiment of the sinusoidal wave pattern is depicted in FIGS. 8A-8B.

Figure 7:
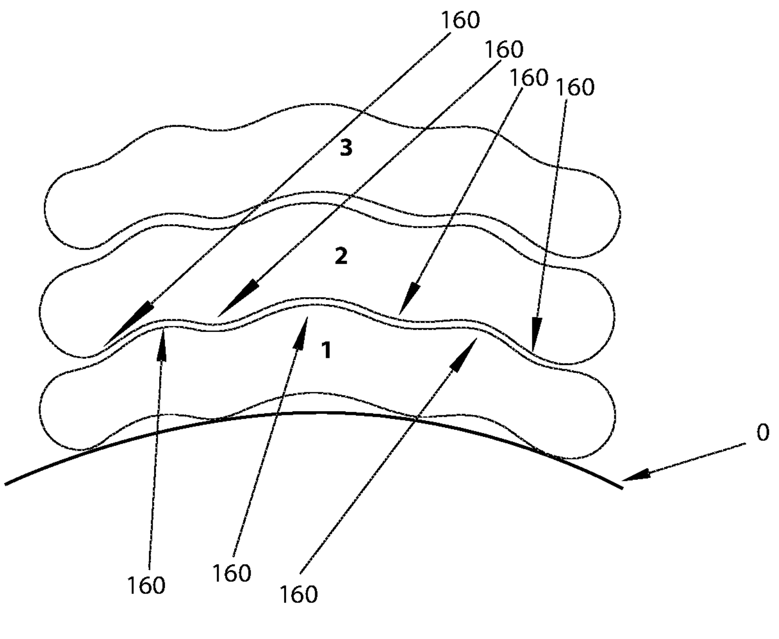
FIG. 7 is an illustration of pressure points induced by the channels of a therapy pad of the cushion.

Therapy pad 30 can be formed by radio-frequency welding (RF welding) sections of fabric together to form channels 32, wherein the weld pattern causes these channels 32 to be in abutment with one another. In an embodiment, the interior and exterior surfaces of channels 32 may have a coating of a substantially air-impermeable and/or liquid-impermeable material, such as urethane laminate. In an alternative embodiment each channel 32 may be formed independently from separate pieces of material. Alternatively, channels 32 and channel interfaces 36 may be formed, as with compartments 22, from two separate pieces of a fabric whereby the seams and channel interfaces 36 are formed by RF welding. As depicted in FIG. 7, channels 32 are generally sloped, or arcuate. When inflated, the arcuate, sinusoidal shape of channels 32 produces pressure points 160. The angle 8 of the slope will be selected to optimize the desired therapeutic effect of massage device 10 and is generally between approximately eleven degrees (11°) and forty-five degrees (45°). In an embodiment, the angle 8 of the slope is approximately twenty-seven degrees (27°).

As mentioned, support pad 20 and therapy pad 30, as well as a cover for support pad 20 and therapy pad 30, can be formed by joining, such as through sewing and RF welding, various layers of fabric or material. Those skilled in the art will recognize that these components (i.e., support pad 20 and therapy pad 30) can be separate devices, or could be integrated into a single integral device. The actual physical embodiments may take many forms.

One example of therapy pad 30 may be formed by joining first layer 52 and second layer 52. First layer 52 has outer first layer perimeter 56 and inner first layer perimeter 57. Similarly, second layer 54 has outer second layer perimeter 58 and inner second layer perimeter 59.

In an embodiment, first layer 52 and second layer 52 are made from RF weld fabric are joined through RF welding such that the walls forming each channel 32 are substantially gas impermeable. Additionally, outer first layer perimeter 56 may be attached to outer second layer perimeter 58 and inner first layer perimeter 57 may be attached to inner second layer perimeter First layer 52 generally also includes defined openings 60. As shown in FIG. 4B, openings 60 are adapted to receive fluid port 34, which allows each channel to thereby be coupled to and in fluid communication with tubing.

First layer 52 and second layer 54 may further include guides 61. Guides 61 facilitate joining first layer 52 and second layer 54, such as by providing a visual stitching marker. Guides 61 are generally situated between channels 32. As depicted in FIG. 4A, guides 61 may be situated between alternating channels 32.

Figure 5B:
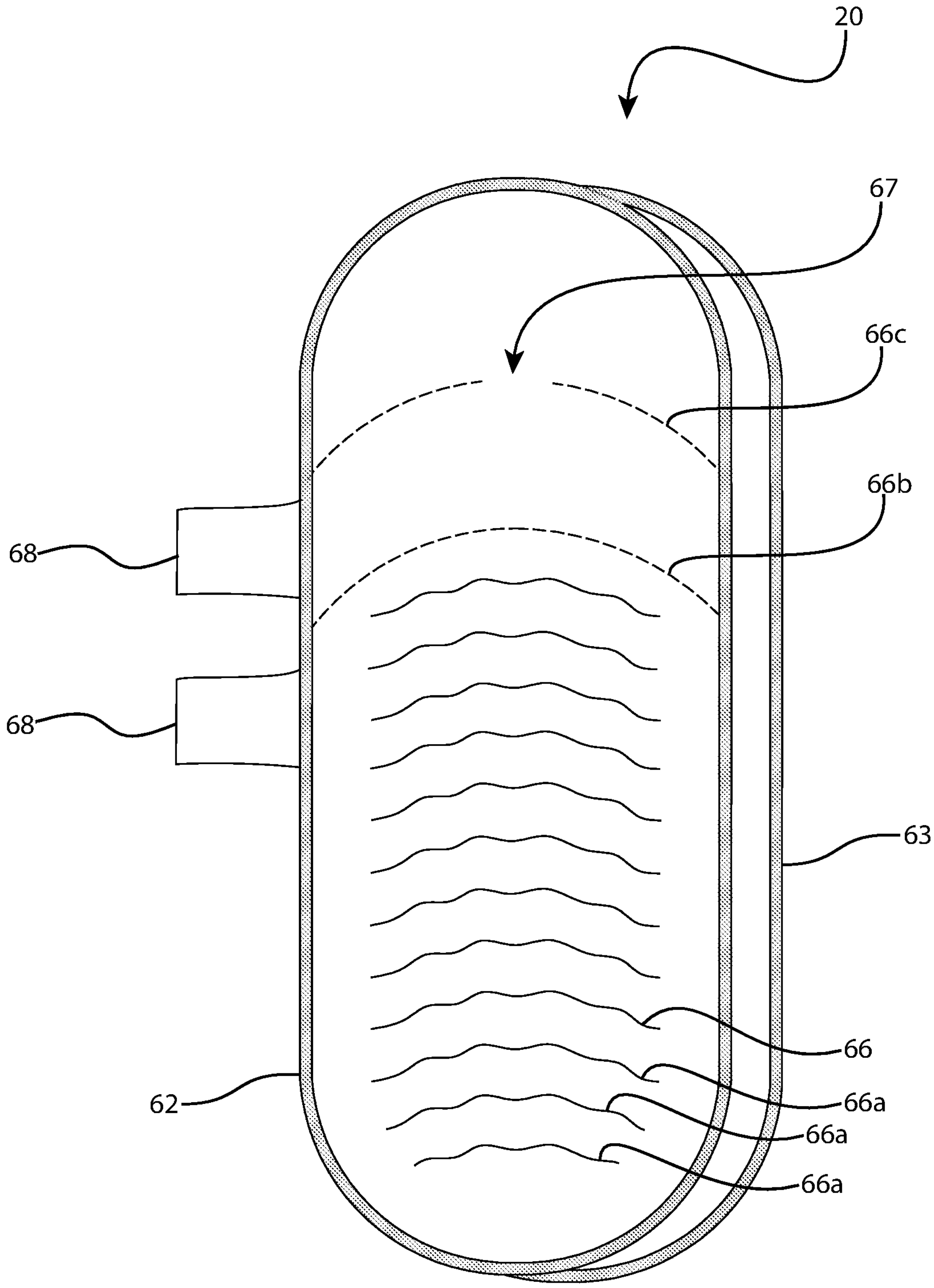
FIG. 5B is an illustration of the fabric used to form a support layer.

Referring further to FIG. 5B, support pad 20 may be formed by joining third layer 62 and fourth layer 63. Third layer 62 defines third layer perimeter 64. Similarly, second layer 54 defines fourth layer perimeter 65. In an embodiment, third and fourth support layers 62, 63 are made from a substantially flexible fabric material, such as Lycra®. Third and fourth layers 62, 63 are generally joined by sewing third layer perimeter 64 to fourth layer perimeter 65. Specifically, third and fourth layers 62, 63 are sewn together along compartment guides 66, thereby forming compartments 22. As shown in FIG. 5B, compartment guides **66*a* may extend partially between support layer perimeters 64, 65, thereby allowing filler material to migrate between compartments of support pad 20, which compartment guide 66*b* may fully extend between support layer perimeters 64, 65 for additional stability and support near a user's shoulder region. As further shown in FIG. 5B, guide 66*c*** located near the neck region of a user to facilitate further migration of filler material and further enhance user comfort.

During construction of support pad 20, portions of third layer perimeter 64 and fourth layer perimeter 65 are joined together, such as by sewing or stitching, leaving openings 68 through which filler material, such as microbeads, can be inserted. When compartments 22 have been sufficiently filled with filler material, openings 68 are closed off Support pad 20 and therapy pad 30 may then be fully joined by aligning guides 61 with compartment guides 66 and sewing, stitching, or otherwise coupling therealong. In an embodiment, intermediate layer 40 is disposed between support pad 20 and therapy pad 30.

Referring to FIGS. 6A-6I, the pre-assembly component parts used according to a method for constructing cushion 12 for message system 300 are depicted. Specifically, such components and methods can be used to form the embodiment of cushion 300 depicted in FIG. 6I. While therapy pad 30 is formed substantially as described above, support pad 20 is formed from separate upper and lower sections 302, 304. Upper section 302 is generally adapted to support the head-neck-shoulder region of a user, while lower section 304 is generally adapted to support the back-gluteal-sacroiliac region of a user.

Referring to FIGS. 6A-6E, upper section 302 includes first upper section layer 306, second upper section layer 308 and third upper section layer 310. In an embodiment, second upper section layer 308 is joined to and between first upper section layer 306 and third upper section layer 310. Referring to FIGS. 6A and 6B, first supper section layer 306 may be joined to second upper section layer 308 by stitching sinusoidal-shaped seems, thereby creating compartments. The joined resulting section is shown in FIG. 6C. Referring to FIG. 6D, perimeter of third upper section layer 310 is then sewn around the first and second upper section layer 306, 308. In this manner first and third upper section layers 306, 310 form a cavity that can be filled with filler material, while first and second upper section layers 306, 308 and second and third upper section layers 308, 310 form substantially separate cavities that can be filled with filler material.

First upper section layer 306 generally includes a plurality of seams 320 that define various compartments. In an embodiment, seams 320 are sinusoidal in shape and define head compartment 322, neck compartment 324 and shoulder compartments 326, which are adapted, respectively, to support the head, neck and shoulder regions of a user. Lower border 312, 314 and 316 are generally fabricated such that the bottom-most shoulder compartment 326 has a slope of approximately eleven degrees (11°) to approximately twenty-four degrees (24°). Referring to FIG. 6E, upper section 302 is fabricated to include openings through which filler material can be inserted and which are closed off once sufficient filler material has been added.

Referring to FIG. 6F, lower section 304 includes first lower section layer 330 and second lower section layer 332. First lower section layer 330 defines first lower section layer perimeter 334 and includes neck portion 336. Similarly, second lower section layer 332 defines second lower section layer perimeter 338 and includes neck portion 340. To construct lower section 304, first and second lower section layers 330, 332 are overlaid and joined, such as by sewing or stitching, to create seams 342. As shown in FIG. 6F, seams 342 generally have a sinusoidal shape, each forming an interface between two compartments 346. In an embodiment, seams 342 are stitched into first and second lower section layers 330, 332 such that lower section defines compartments 344, 346. Compartment 344 is generally adapted to be positionable along the spinal region of a user. Compartments 346 traverse the spinal region of a user, thereby providing support to the gluteus, lumbar and thoracic curves of a user.

Once seams 342 are formed, first lower section layer perimeter 334 and second lower section layer perimeter 338 are joined, such as through stitching or other suitable techniques. In an embodiment, the distal ends of neck portions 336, 340 are initially left unstitched, thereby providing an opening through which filler material, such as microbeads, can be inserted. Once the cavity between first and second lower section layers is sufficiently filled, the distal end of neck portions 336, 340 are joined. Cover 348 may also be attached to support pad 20.

Referring to FIG. 6G, upper section 302 and lower section 304 are joined to form support pad 20. Support pad 20 can then be attached to therapy pad 30 to form cushion 300. In an embodiment, channels 32 of therapy pad 30 overlay seams 342 of support layer 30. Cover 348 may then be wrapped about support pad 20 and therapy pad 30.

While support pad 30 generally provides dynamic, responsive support to a user on its own, therapy pad 20 utilizes channels 32 to provide unique pressure profiles for delivering therapeutic massage treatment. Specifically, the combination of the slope of channels 32 and the sine-wave pattern of channel interfaces 36 creates a specific pattern of pressure points that can be delivered to an individual in a customized sequence, thus delivering a dynamic pressure-therapy treatment designed to impart a therapeutic effect tailored to the needs of an individual. The sine-wave pattern of channel interfaces 36 permits pressure to be applied in a variable pattern across portions of the individual's body. Specifically, as shown in FIG. 7, the sinusoidal shape creates hills and valleys when adjacent channels are inflated—relatively high pressure occurring at the "hills" and relatively low pressure occurring at the valleys. As channels 36 are sequentially inflated and deflated, the hills and valleys are also inflated and deflated accordingly, thereby creating a massaging effect that follows the progression of the inflation and deflation of channels 36.

In an embodiment, therapy pad 30 includes a plurality of channels 32, which abut at channel interfaces. One skilled in the art will readily recognize, however, that therapy pad 30 can include any number of channels 32 and channel interfaces 36 without departing from the spirit or scope of the present invention. The number and size of channels 32 may be varied in accordance with the anatomical region of the individual targeted by massage system 10. Referring again to the pressure profiles depicted in FIGS. 9-13, for example, therapy pad 30 may be configured with sixteen (16) compartments adapted to provide massage therapy to the gluteal, lumbar, thoracic, and cervical curves of an individual. Therapy pad 30 may also be configured to provide massage therapy to various regions and areas, such as the shoulder region of an individual.

As indicated above, a feature of the present invention is the ability to deliver customized massage therapy to a user by selectively inflating and deflating channels 32 of therapy pad 30. Controller unit 16 inflates and deflates channels by sequentially delivering a fluid, such as air, to channels 32 and subsequently removing the fluid from the channels 32. Controller unit 16 generally includes at least a processor programmed to deliver customized pressure profiles to an individual. Controller unit 16 may also include mechanism to directing air into and out of channels of therapy pad 30, such as diverter 100 or diverter 200, as well actuators (not depicted) that are operably connected to diverter 100 or 200 and an air compressor. Alternatively, diverter 100 or 200 and the actuators may be provided as a separate unit or separate units. The diverter 100 or 200 includes at least one chamber, and generally a plurality of chambers, that are adapted to communicate to therapy pad 30 air that is supplied from an air source. The processor can be instructed to control the air compressor and diverter 100 or 200 so as to deliver a desired pressure-therapy treatment to an individual.

Figure 15:
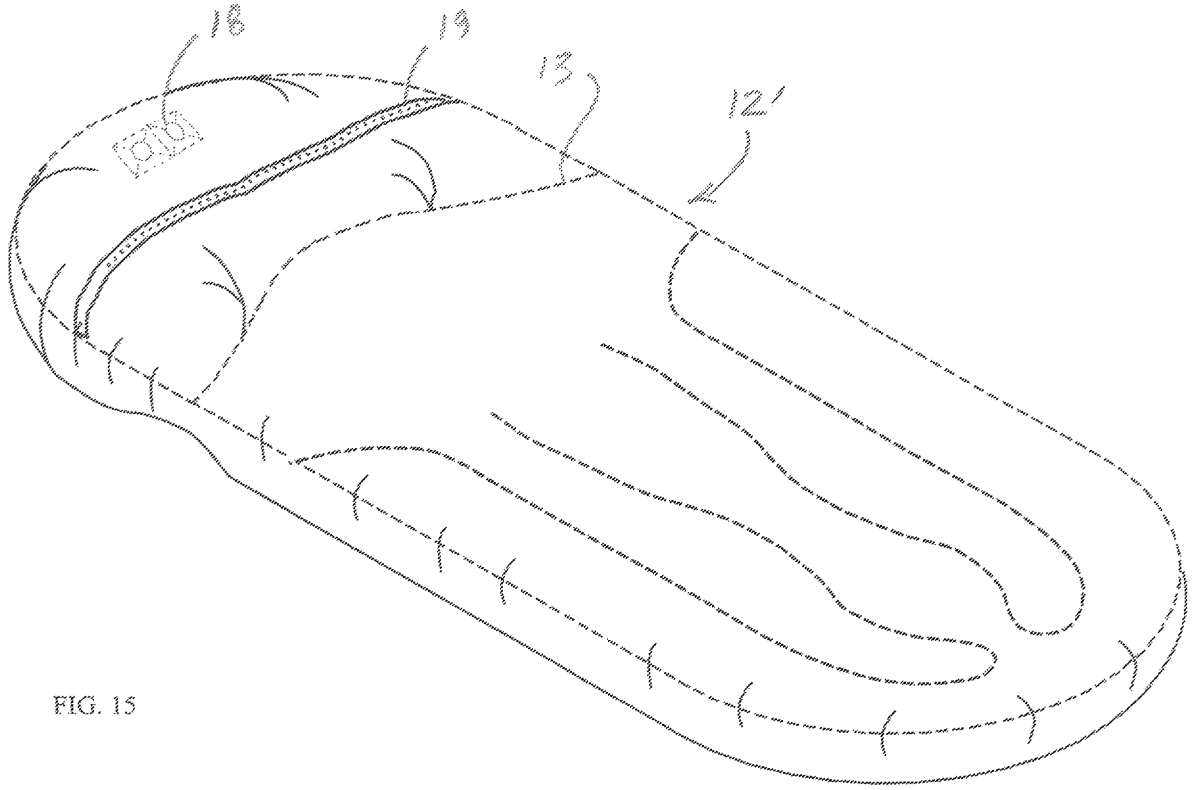
FIG. 15 depicts the cushion of FIG. 14, bottom or underside perspective view.
Figure 16:
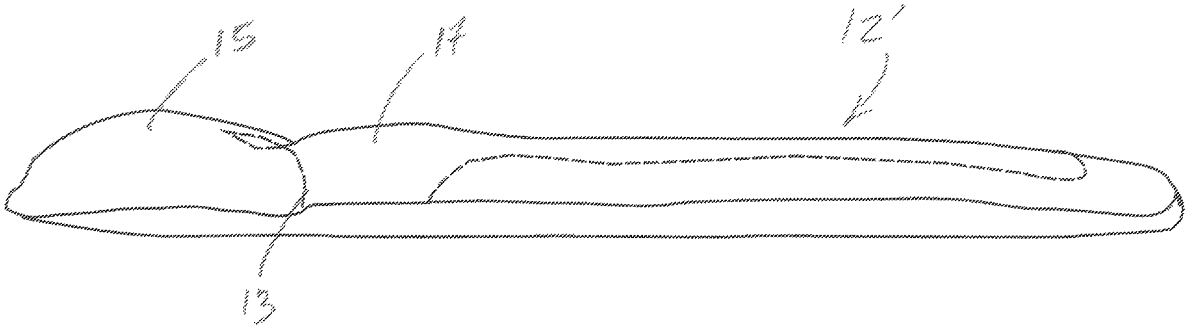
FIG. 16 depicts the cushion of FIG. 14, side elevation, head portion figure left.
Figure 17:
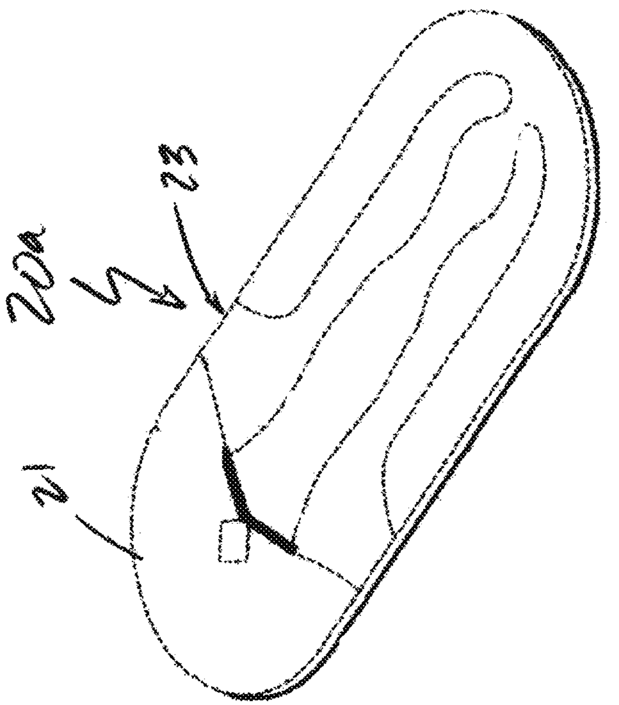
FIG. 17 depicts the support pad of the cushion of FIG. 14, more particularly, an upper cover assembly thereof, head portion figure left.
Figure 18:
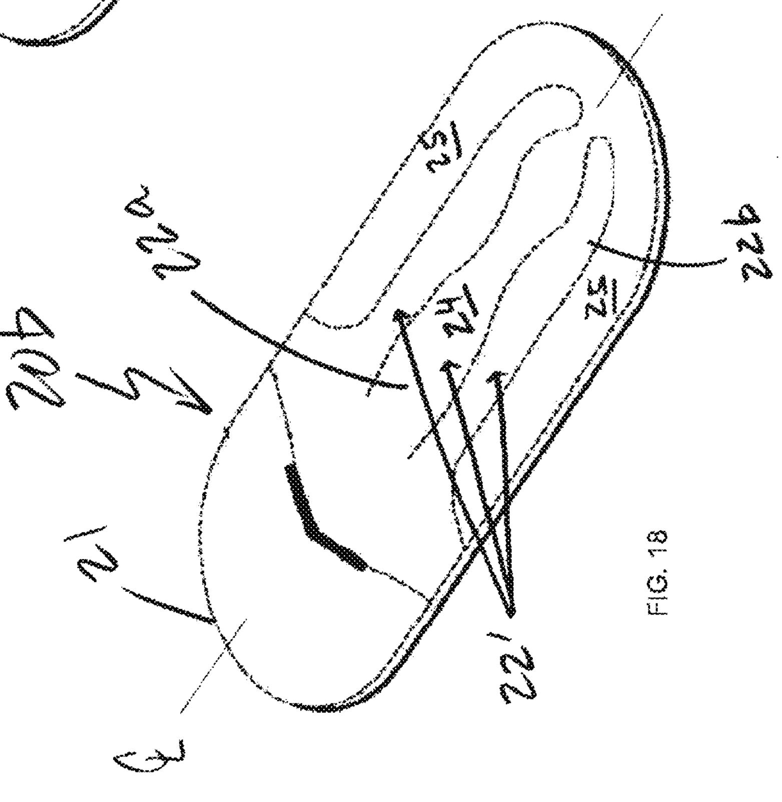
FIG. 18 depicts the support pad of FIG. 14, more particularly, a lower compartment assembly thereof.
Figure 19:
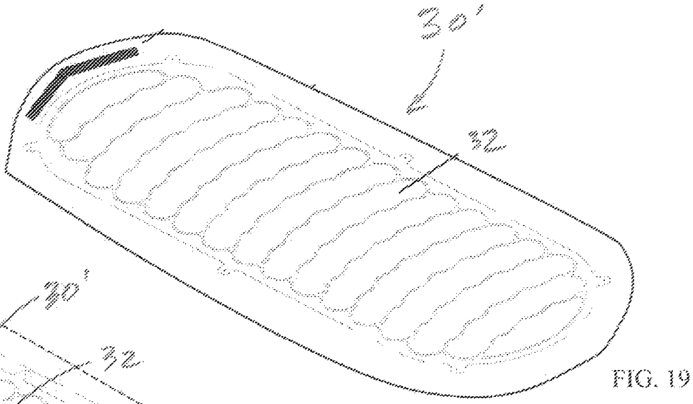
FIG. 19 depicts the therapy pad of the cushion of FIG. 14, more particularly, toporupperside perspective view, shoulder portion figure left.

Turning now and generally referencing FIGS. 14-16, there is shown a further advantageous, non-limiting therapeutic massage system 10' (FIG. 14) characterized by a controllable compressed air delivery system 8, and a cushion 12', adapted for operative union with a portion of the controllable compressed air deliver system, characterized by a support pad 20' (FIGS. 17 & 18) and a therapy pad 30' (FIG. 19). As will be subsequently taken up, the support pad of the instant embodiment departs from that of the heretofore described/shown support pad(s) and has been found to be especially advantageous in the context of the cushion and in effectuating the imparting of heretofore unequaled therapeutic mechanical massage in a non-clinical setting.

With initial and passing reference to FIGS. 14-16, there is generally shown therapy pad 30' for receipt of a user, the head received figure left FIGS. 14 & 16 upon head rest 15. A landmark comprised of diamond stitching indicates a target/landing for the occipital bone. In addition to such landmark, a neck/shoulder break 13 and a shoulder rest 17 are associated with the cushion upper, indicated as shown FIGS. 14 & 16, with a grommet set 18 and transverse zipper 19 associated with the cushion underside, indicated as shown FIG. 15, for passage of tubing/a tubing harness and access to a cushion cavity, advantageously, but not necessarily for housing a pillow (not shown).

Figure 20:
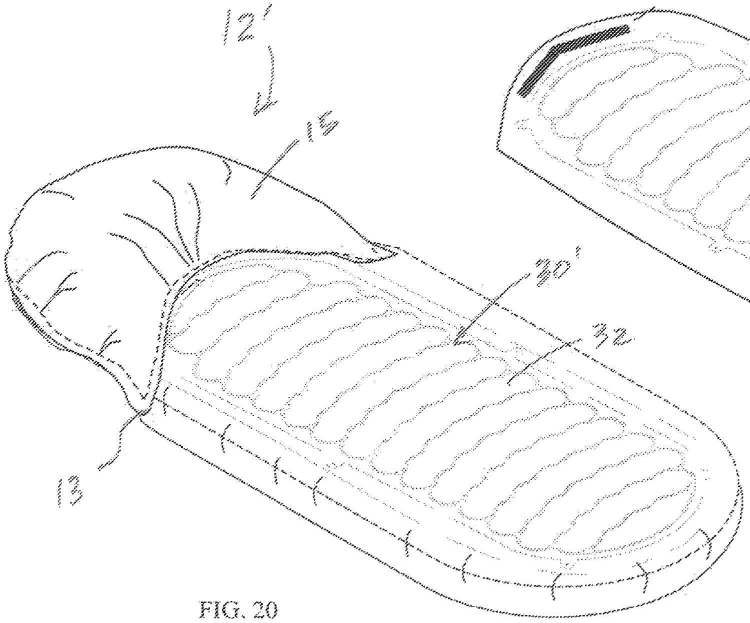
FIG. 20 depicts the therapy pad of the cushion of FIG. 14 elements and/or sub elements omitted for the sake of revealing underlying particulars, more particularly, a portion of the cover assembly removed to reveal the therapy pad of FIG. 19.
Figure 21:
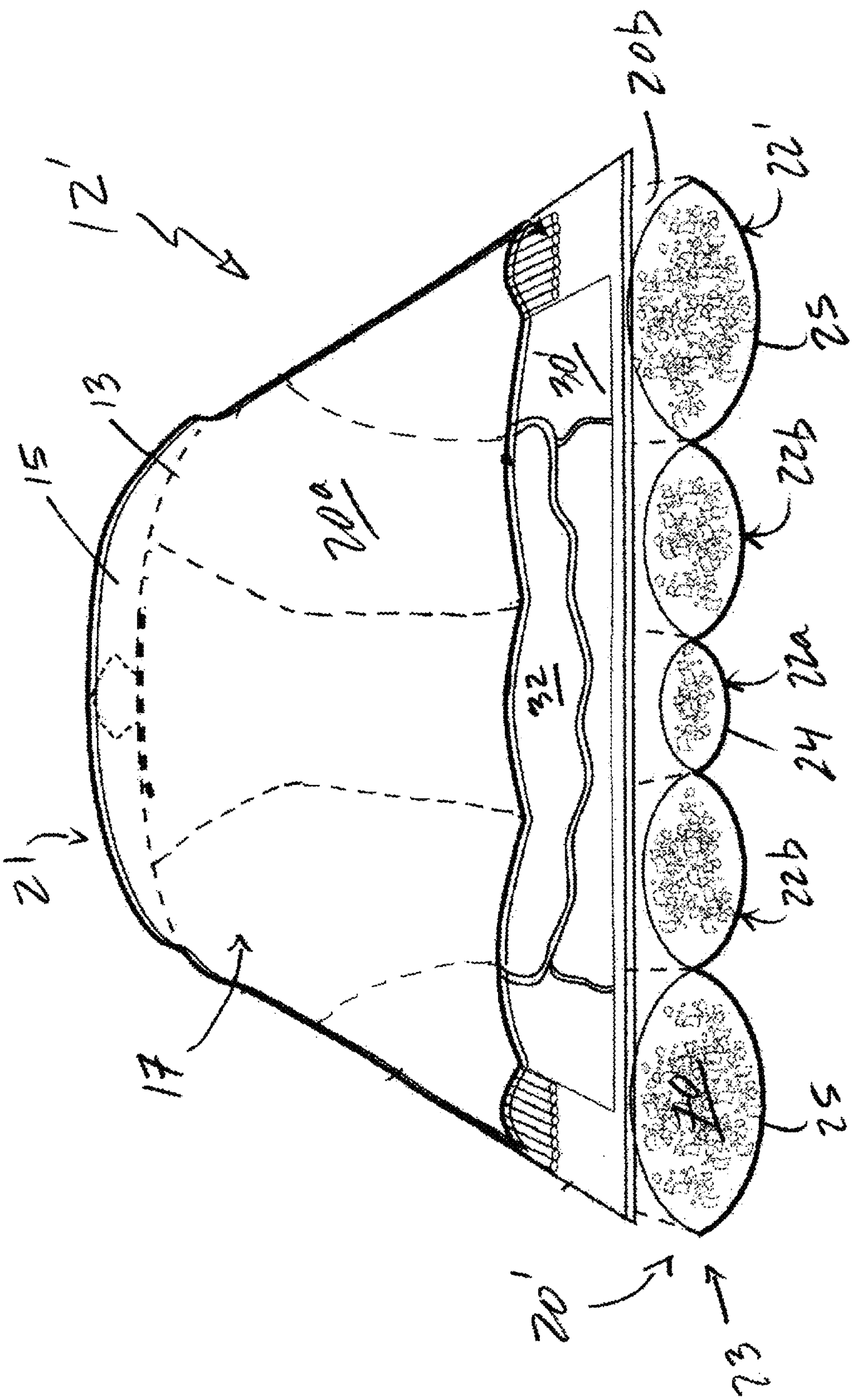
FIG. 21 is a schematic section about line 21-21' of FIG. 14, elements and or sub elements of the cushion depicted.

Cushion 12' is characterized by a support pad 20' and a therapy pad 30' as is best appreciated with reference to the schematic section of FIG. 21. Notionally, support pad 20', advantageously characterized by upper and lower portions corresponding to cover and compartment assemblies **20*a*, 20*b* (FIGS. 17 & 18 respectively), has head and vertebral column supporting regions or portions 21, 23 (FIG. 17), vertebral column supporting portion 23 characterized by longitudinally extending compartments 22' in compartment assembly 20*b* containing filler/filling material 70 (FIG. 21), more particularly, compartments 22*a* and 22*b*. A central longitudinally extending compartment 22*a* of longitudinally extending compartments 22' has a primary region 24 traversing an axial centerline of the cushion, and secondary regions 25 spaced apart from the primary central region 24. Compartments 22*b*, like compartment 22*a*, commencingly extend from a neck/shoulder break 13, an elongate portion of same nested between or among the primary secondary regions 24, 25 of the central longitudinally extending compartment 22*a*, notionally having free ends that delimited those regions. Therapy pad 30' overlays and is generally affixed to vertebral column supporting portion 23 of support pad 20', the union generally delimiting neck/shoulder break 13 for the cushion (FIG. 20, see also FIG. 16, the head received on the cushion to the left of the break, the shoulders on shoulder rest 17** to the right of the break).

Therapy pad 30' includes a plurality of fluid fillable channels 32 for receiving a vertebral column, more broadly/notionally, the dorsum (see generally FIG. 22), wherein select fluid fillable channels of the plurality of fluid fillable channels 32 thereof are fillable via programmed actuation of an actuatable element of the controllable compressed air delivery system 8 (FIG. 14). In keeping with prior embodiment descriptions, the channels traverse the therapy pad and are arcuately configured, with non-linear opposing longitudinal edges, edges/seams.

Filler material of support pad compartments 22 are responsive to receipt of body weight upon the cushion, and likewise the select filling of the plurality of fluid fillable channels 32 of therapy pad 30'. Filling material 70 of regions 24, 25 of central compartment **22*a*** is passable throughout segments of same (i.e., has the ability to migrate within the compartment, e.g., to/from regions thereof), in response to receipt of body weight upon said cushion and select filling of said plurality of fluid fillable channels of said therapy pad, a synergistic combination of a structurally supported support pad, as by a table or the like, more specifically, the filled compartments of vertebral column support portion of the support pad, the filled/filling/fillable channels of the therapy pad overlying the support pad compartments, and applied body weight owing to a user supine on the cushion deliver an especially advantageous tactile user experience.

Central longitudinally extending compartment 22*a*, more particularly region 24 thereof, is advantageously configured so as to include sacroiliac joint and coccyx receiving portions. Moreover, the compartments 22*b* and regions 25 of the central longitudinally extending compartment 22*a* support an upper portion of the buttocks of a user. Shoulder rest 17 of the cushion correlates with portions of compartments 22*a* and 22*b*, more particularly, portions adjacent and extending from the neck shoulder break 13 (see FIG. 14 as to the cushion, FIG. 17 as to the support pad.

Finally, with regard to cushion 12', some parting observations are warranted in connection to the relationship for, between and among the support pad and therapy pad. As previously set forth, support pad 20' includes upper (FIG. 17) and lower (FIG. 18) surfaces/portions, more particularly, cover assembly 20*a* and compartment assembly 20*b* respectively. Therapy pad 30' (FIG. 19) is affixed in a structural stack up (FIG. 21) so as to be intermediate the lower and upper portions of the cushion, namely, affixed to compartment assembly 20*b* and underlying cover assembly 20*a*.

Figure 9:
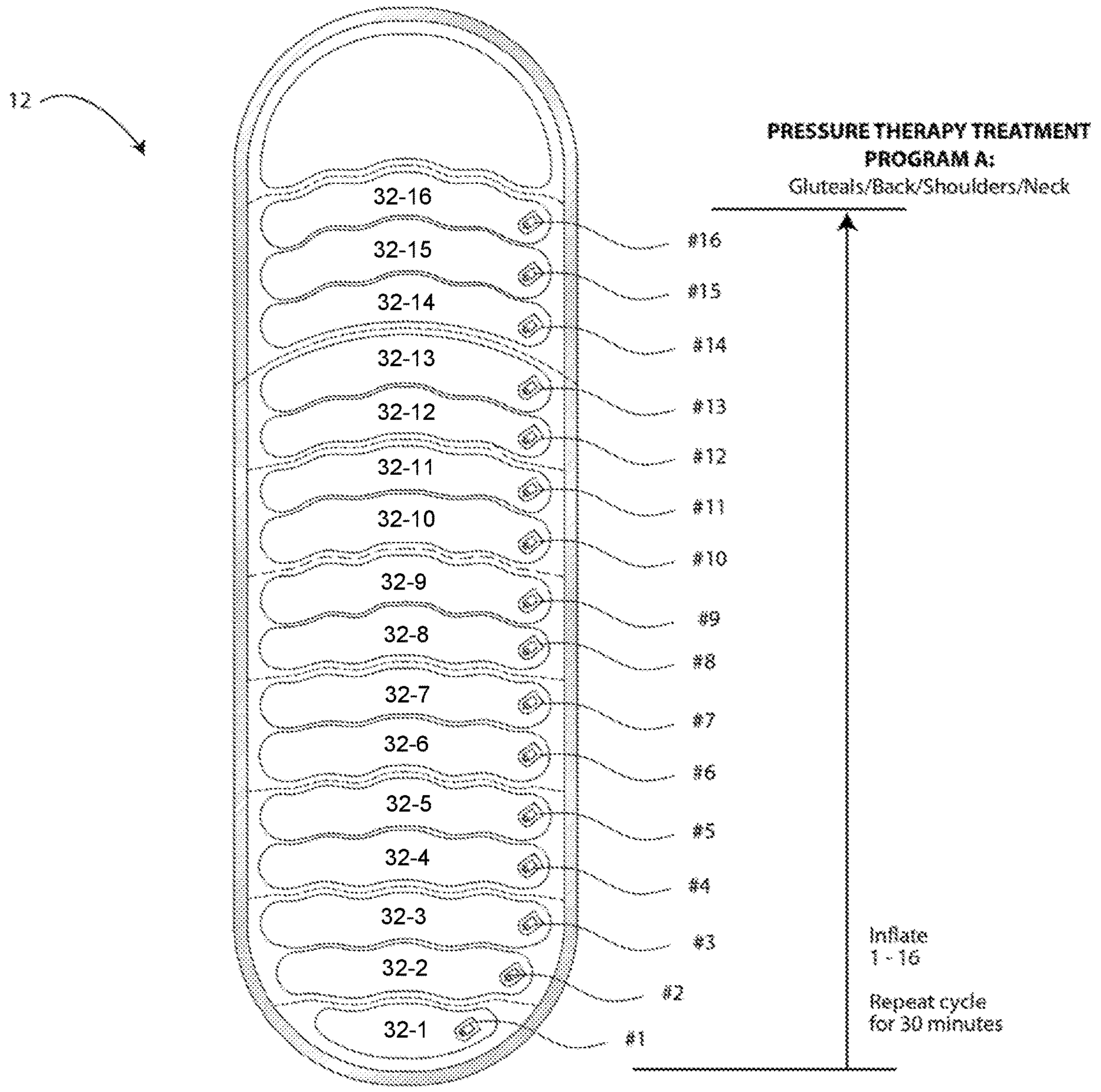
FIG. 9 illustrates a pressure profile for a pressure-therapy treatment.

Turning now to operation or system function, one skilled in the art will readily recognize that any number of unique pressure-therapy treatment programs can be developed to treat conditions and other ailments for which therapeutic massages can provide treatment or relief Generally, such pressure-therapy treatments will progress in a direction toward the cervical curve from the gluteus curve. Referring to FIG. 9, processor of controller unit 16 can be programmed to treat an individual's gluteus, back, shoulders, and next by repeating a cycle of inflating channels 32 marked #1-#16 for 30 minutes. Each of these channels may be operably connected to a separate chamber 132. Alternatively, multiple channels may be operably connected to a single chamber 132. The pressure profile is created by first inflating channel #1, then deflating channel #1 while inflating channel #2, then deflating channel #2 while deflating channel #3, and continuing this progression until channel #16 is inflate.

Figure 10:
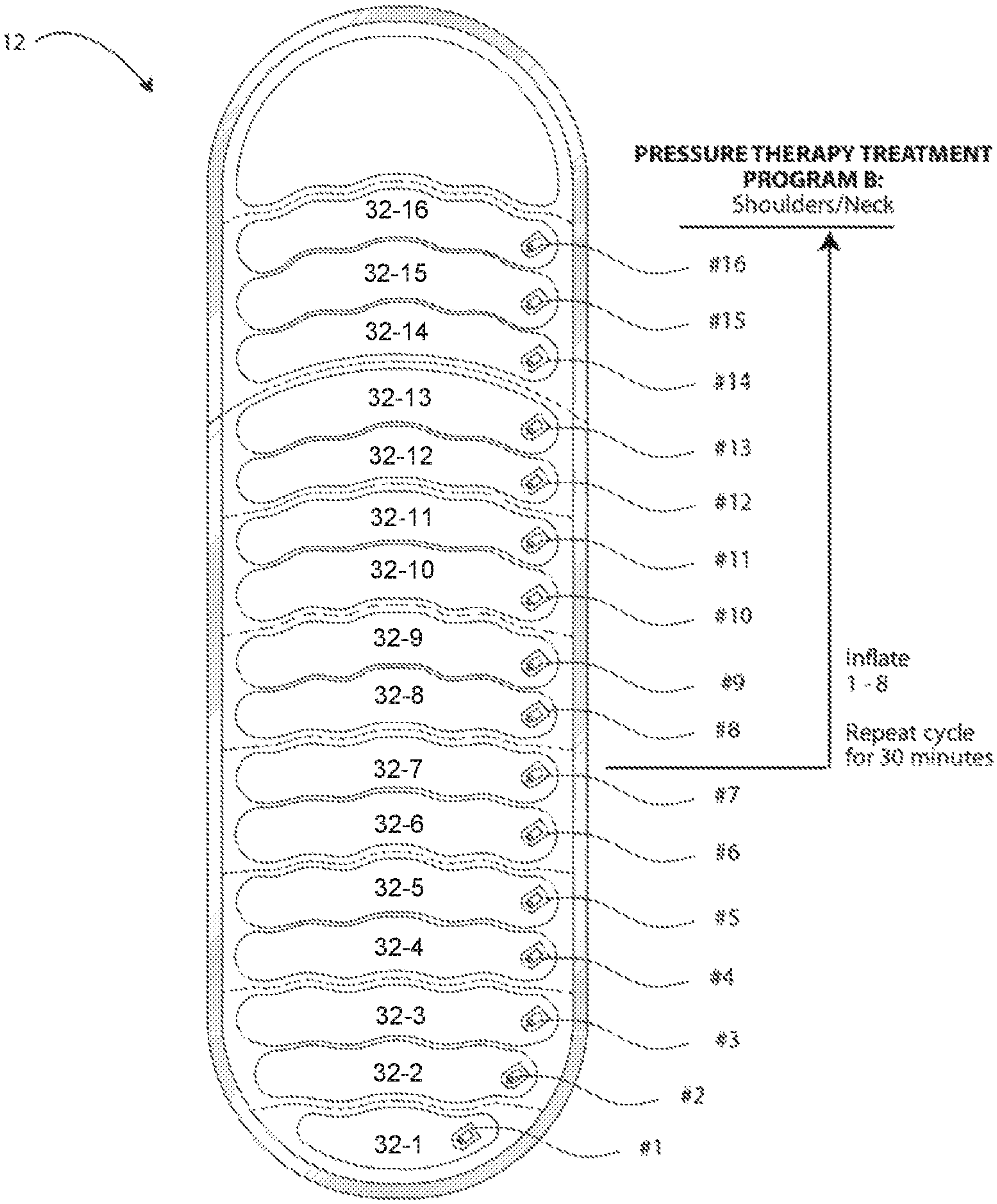
FIG. 10 illustrates an alternative pressure profile for a second pressure-therapy treatment.
Figure 11:
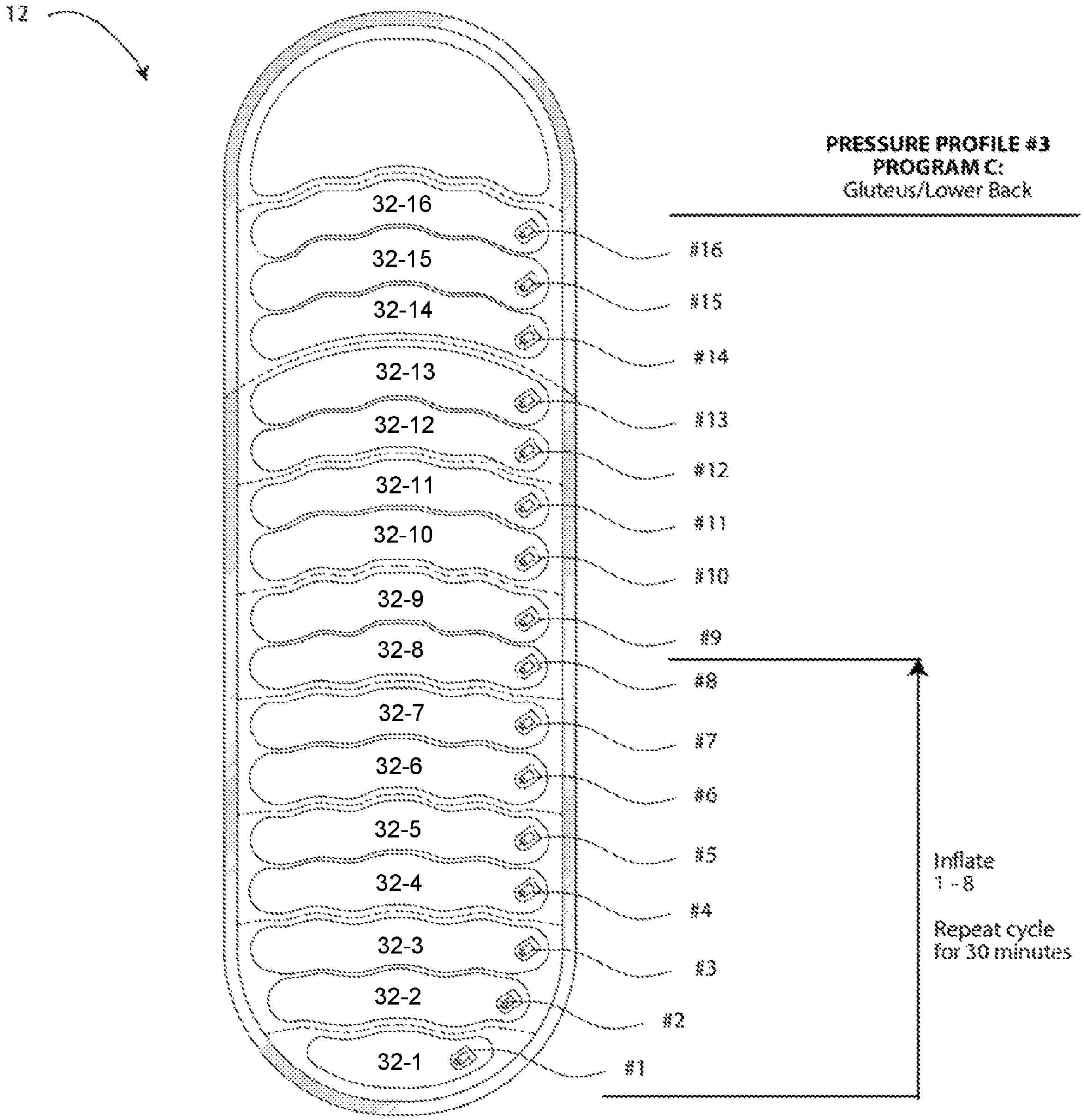
FIG. 11 illustrates yet another pressure profile for delivering a third pressure-therapy treatment.
Figure 12:
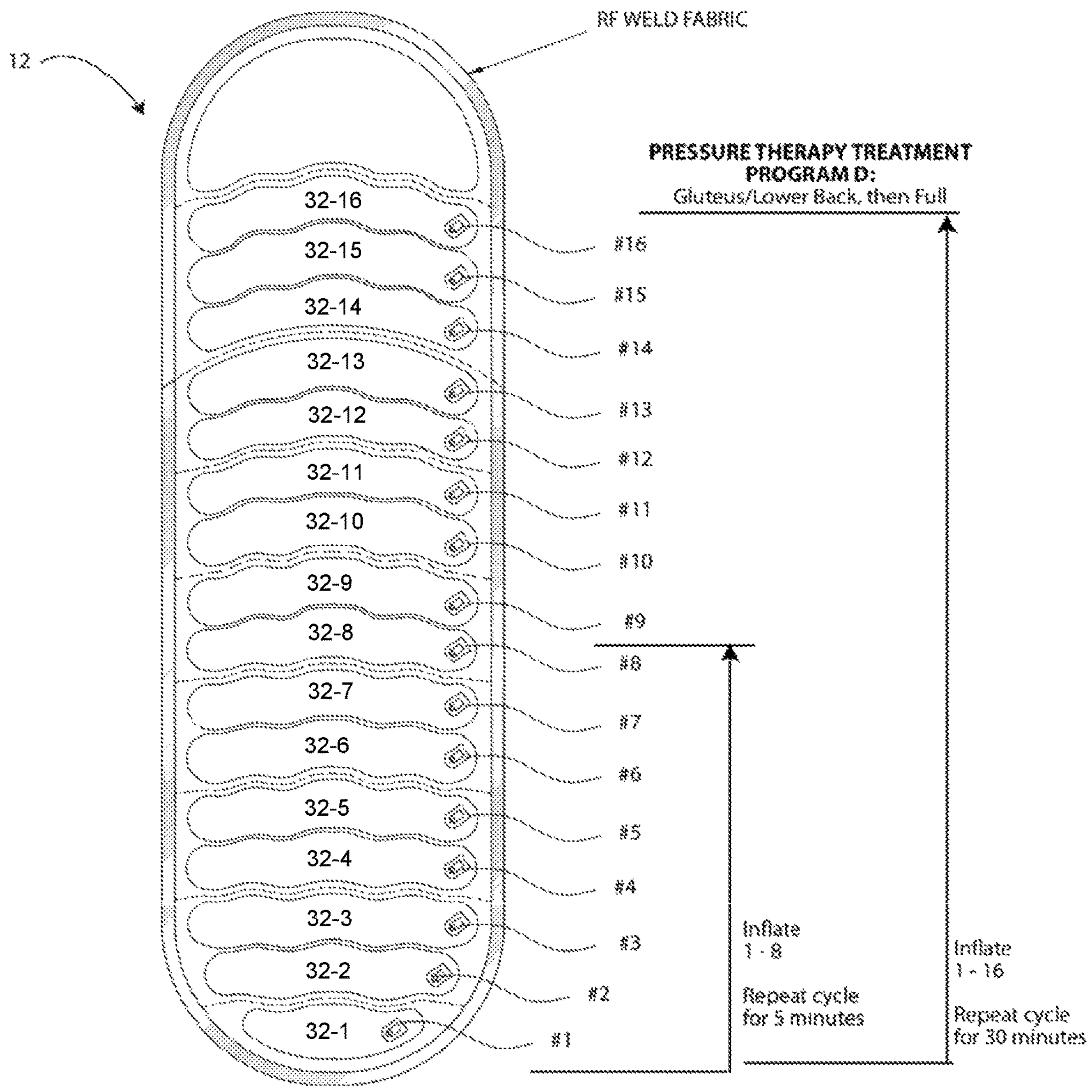
FIG. 12 illustrates a further pressure profile for delivering a fourth pressure-therapy treatment by the massage system.
Figure 13:
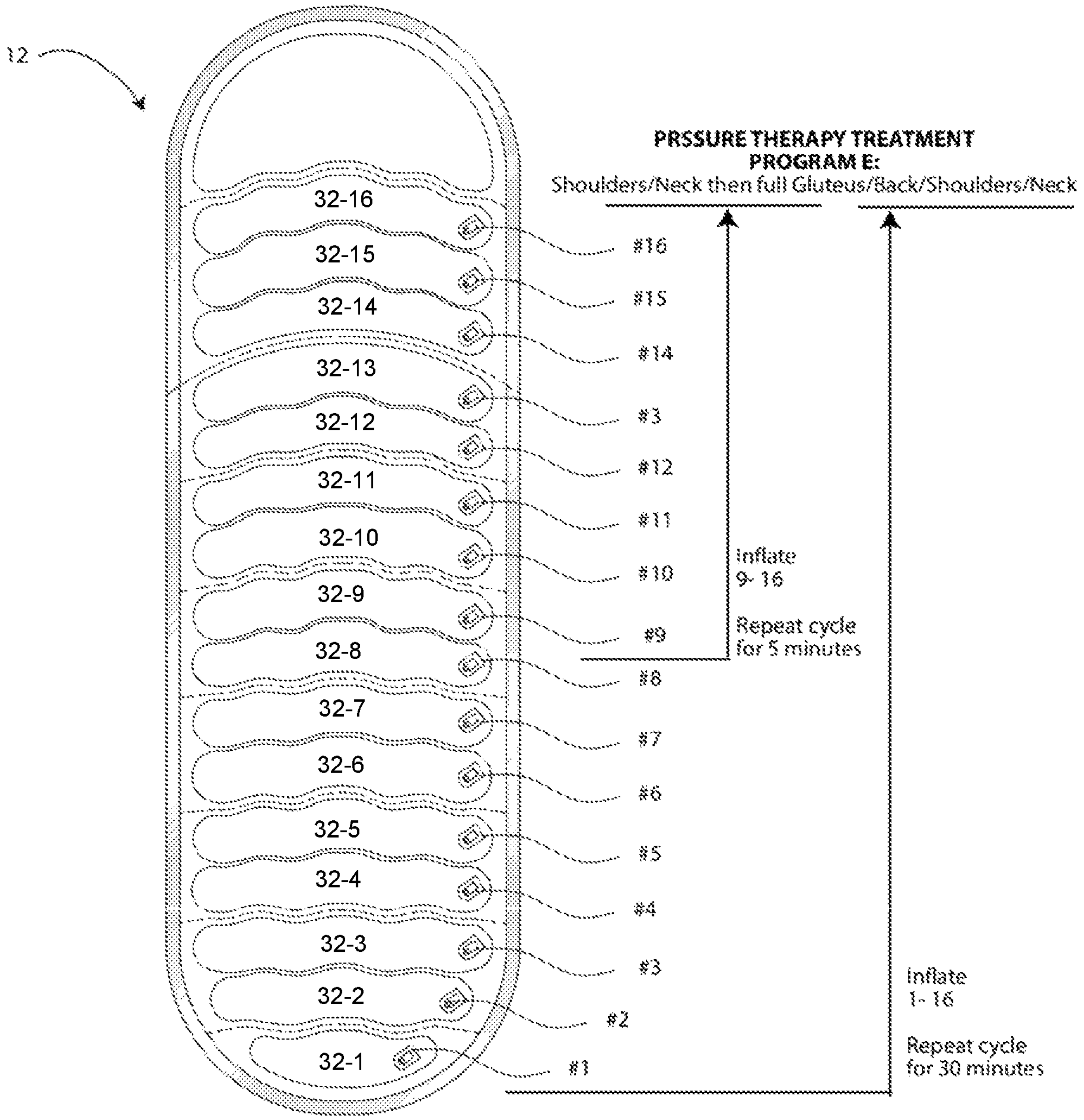
FIG. 13 illustrates an additional pressure profile for delivering a fifth pressure-therapy treatment.

Referring to FIG. 10, massage system 10 provides therapeutic massage treatment to an individual's shoulder and neck by progressively inflating and deflating channels 32 marked #8-#16. Referring to FIG. 11, massage system 10 provides therapeutic massage treatment to an individual's gluteus and lower back by progressively inflating and deflating channels 32 marked #1-#8. Referring to FIGS. 12-13, massage systems provides asymmetric therapeutic massage treatment to an individual's gluteus, back, shoulders. As shown in FIG. 12, treatment is first applied to the individual's gluteus and lower back, followed by treatment to individual's gluteus, lower and upper back, shoulders, and neck. As shown in FIG. 13, treatment is first applied to the individual's shoulders and neck, followed by treatment to the individual's gluteus, back, shoulders, and neck.

Massage system 10 is thereby capable of providing multiple sources of pressure therapy. A first source of pressure therapy originates in support pad 20, which applies pressure by continuously conforming to and adjusting and supporting an individual's body. A second source of pressure therapy originates in therapy pad 30, which applies localized pressure along sinusoidal-shaped channels 32 located between the individual's body and support pad 20. A third source of pressure therapy originates m the controller unit 16, which can execute instructions for sequentially inflating and deflating channels 32 of therapy pad 30 in accordance with a prescribed treatment plan, e.g., an MDL treatment plan. These sources may be used alone, or in any combination with one another.

Various embodiments of the invention have been described above for purposes of illustrating the details thereof and to enable one of ordinary skill in the art to make and use the invention. The details and features of the disclosed embodiment or embodiments are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

What is claimed:

1. A therapeutic massage system comprising a controllable compressed air delivery system and a cushion adapted for operative union with a portion of said controllable compressed air delivery system, said cushion including a head receiving first end and a sacrum receiving second end opposite said head receiving first end, said cushion comprising a support pad and a single therapy pad, said support pad having head and vertebral column supporting portions, said vertebral column supporting portion of said support pad characterized by longitudinally extending compartments containing filler material, a first compartment of said compartments having a primary region traversing an axial centerline of said cushion, said primary region bifurcated at an end thereof so as to delimit secondary regions extending about a portion of a peripheral margin of said support pad toward said head supporting portion of said support pad in a spaced apart condition from said primary region, said single therapy pad overlying and affixed to said vertebral column supporting portion of said support pad, said single therapy pad including a plurality of fluid fillable channels for receiving a vertebral column wherein select fluid fillable channels of said plurality of fluid fillable channels of said single therapy pad are fillable via programmed actuation of an actuatable element of said controllable compressed air delivery system, filler material of said compartments of said vertebral column supporting potion of said support pad responsive to receipt of body weight upon said cushion and select filling of said plurality of fluid fillable channels of said single therapy pad, filler material of said first compartment of longitudinally extending compartments of said vertebral column supporting potion of said support pad being passable within and/or between a region of either or both of said primary region or said secondary regions of said first compartment of said compartments in response to receipt of body weight upon said cushion and select filling of said plurality of fluid fillable channels of said single therapy pad.

2. The therapeutic massage system of claim 1 wherein said support pad comprises first and second resilient fabric layers selectively united to form said compartments of said vertebral column supporting portion of said support pad.

3. The therapeutic massage system of claim 1 wherein said single therapy pad is affixed to said support pad such that said plurality of fluid fillable vertebral column receiving channels of said single therapy pad occupy an area interior of said peripheral margin of said support pad.

4. The therapeutic massage system of claim 1 wherein said support pad comprises a union of first and second support pad sections, said first support pad section comprising said head supporting portion and said second support pad section comprising said vertebral column supporting portion.

5. The therapeutic massage system of claim 1 wherein said compartments of said vertebral column supporting portion of said support pad abut one another at a seam to form compartment interfaces.

6. The therapeutic massage system of claim 1 wherein said filler material comprises microbeads.

7. The therapeutic massage system of claim 1 wherein said filler material comprises foam elements.

8. The therapeutic massage system of claim 1 wherein said filler material comprises a combination of microbeads and foam elements.

9. The therapeutic massage system of claim 1 wherein said single therapy pad comprises first and second fabric layers selectively united to form channels of said plurality of fluid fillable channels.

10. The therapeutic massage system of claim 1 wherein said single therapy pad comprises first and second fabric layers selectively united via radio frequency welding to form channels of said plurality of fluid fillable channels.

11. The therapeutic massage system of claim 1 wherein said single therapy pad comprises first and second fabric layers selectively united to form channels of said plurality of fluid fillable channels, each fabric layer of said first and second fabric layers including a urethane coated side, the fabric layers having their coated sides selectively united.

12. The therapeutic massage system of claim 1 wherein said single therapy pad comprises a union of first and second therapy pad sections, said first therapy pad section characterized by fluid fillable channels of the plurality of fluid fillable channels corresponding to cervical vertebrae, said second therapy pad section characterized by fluid fillable channels of the plurality of fluid fillable channels corresponding to vertebrae selected from the group consisting of thoracic, lumbar and gluteal vertebrae.

13. The therapeutic massage system of claim 1 wherein said single therapy pad is adapted for operative union with the portion of said controllable compressed air delivery system.

14. The therapeutic massage system of claim 1 wherein channels of said plurality of fluid fillable channels of said single therapy pad abut one another at a seam to form channel interfaces.

15. The therapeutic massage system of claim 1 wherein channels of said plurality of fluid fillable channels of said single therapy pad abut one another at an undulating seam to form channel interfaces.

16. The therapeutic massage system of claim 1 wherein channels of said plurality of fluid fillable channels of said single therapy pad are curved throughout a length thereof.

17. The therapeutic massage system of claim 1 wherein channels of said plurality of fluid fillable vertebral column receiving channels of said single therapy pad are each adapted for operative union with the portion of said controllable compressed air delivery system.

18. The therapeutic massage system of claim 1 further comprising a cover, said cover receiving and enclosing said cushion.

19. A therapeutic massage cushion adapted for operative union with a portion of a programmable fluid delivery system, the cushion comprising a non-pneumatic support pad and a single pneumatic therapy pad, said non-pneumatic support pad having head and vertebral column supporting regions and upper and lower portions, said lower portion of said non-pneumatic support pad characterized by said supporting regions, said vertebral column supporting region of said support pad characterized by longitudinally extending compartments containing filler material, a compartment of said compartments having a primary compartment region traversing an axial centerline of said cushion, said primary compartment region bifurcated at an end thereof so as to delimit subordinate portions of said primary compartment region extending about a portion of a periphery of said support pad toward said head supporting region of said support pad in a spaced apart condition from said primary compartment region, said filler material migratable throughout said compartments, said single pneumatic therapy pad overlying and affixed to said vertebral column supporting portion of said non-pneumatic support pad, said single pneumatic therapy pad including a plurality of adjacent fluid fillable channels for receiving a vertebral column, said fluid fillable channels traversing a width of said single pneumatic therapy pad, at least a portion of said plurality of adjacent fluid fillable channels of said single pneumatic therapy pad being curved throughout a length thereof, select fluid fillable channels of said plurality of adjacent fluid fillable channels of said single pneumatic therapy pad being selectively fillable via programmed actuation of an actuatable element of the programmable fluid delivery system.

20. A therapeutic massage cushion, adapted for operative union with a portion of a programmable fluid delivery system, comprising a support pad and a therapy pad, said support pad having head and vertebral column supporting portions, said portions delimited by a seam traversing a width of said support pad, said head supporting portion characterized by a compartment, bounded by said seam, containing filler material, said vertebral column supporting portion of said support pad characterized by compartments containing filler material, a compartment of compartments of said vertebral column supporting portion of said support pad having central and peripheral portions, filler material migratable within and between said portions of said compartment of said compartments of said vertebral column supporting portion of said support pad, said therapy pad overlying and affixed to said vertebral column supporting portion of said support pad, an upper surface of said cushion thereby characterized by said head supporting portion of said support pad and said therapy pad, said therapy pad including a plurality of fluid fillable channels for receiving a vertebral column wherein select fluid fillable channels of said plurality of fluid fillable channels of said therapy pad are fillable via programmed actuation of an actuatable element of a controllable fluid delivery system.

* * * * *